United States Patent
Jarema, III et al.

(10) Patent No.: US 7,125,080 B1
(45) Date of Patent: Oct. 24, 2006

(54) FOLDABLE ARMREST FOR CHAIR

(75) Inventors: Stephen Jarema, III, Newfield, NJ (US); Edward J. Dwyer, Jr., Pittsgrove, NJ (US)

(73) Assignee: Electric Mobility Corporation, Sewell, NJ (US)

( * ) Notice: Subject to any disclaimer, the term of this patent is extended or adjusted under 35 U.S.C. 154(b) by 0 days.

(21) Appl. No.: 10/277,807

(22) Filed: Oct. 23, 2002

(51) Int. Cl.
  *A47C 7/54* (2006.01)
  *B60N 2/46* (2006.01)
  *B60N 2/30* (2006.01)
  *B60N 2/38* (2006.01)

(52) U.S. Cl. .............. 297/411.32; 297/411.3; 297/411.35; 297/411.38; 297/411.39; 297/411.44; 297/378.1; 297/378.12

(58) Field of Classification Search .......... 297/411.32, 297/411.34, 411.35, 411.39, 411.31, DIG. 4, 297/411.3, 411.38, 411.44, 378.1, 378.12; 280/250.1, 304.1, DIG. 5; 180/907
See application file for complete search history.

(56) References Cited

U.S. PATENT DOCUMENTS

| | | | | |
|---|---|---|---|---|
| 333,321 A | * | 12/1885 | Mink | 297/378.12 X |
| 792,566 A | * | 6/1905 | Wiersching et al. | 297/411.32 X |
| 1,104,615 A | * | 7/1914 | Braden | 297/411.32 X |
| 1,420,924 A | * | 6/1922 | Hogan | 297/411.32 X |
| 1,953,855 A | * | 4/1934 | Headworth | 297/378.12 |
| 1,997,767 A | * | 4/1935 | Dorkins | 297/378.1 |
| 2,085,836 A | * | 7/1937 | Tatum | 297/411.39 |
| 2,480,812 A | * | 8/1949 | Muller | 297/378.12 |
| 3,004,619 A | | 10/1961 | Straussler | |
| 3,025,106 A | * | 3/1962 | Evans et al. | 297/378.12 X |
| 3,213,957 A | | 10/1965 | Wrigley | |
| 3,369,629 A | | 2/1968 | Weiss | |
| 3,580,348 A | | 5/1971 | DiBlasi | |
| 4,010,499 A | * | 3/1977 | Davis et al. | 5/87.1 |
| 4,026,573 A | | 5/1977 | Richardson | |
| 4,067,613 A | * | 1/1978 | Pesiri | 297/411.29 |
| 4,073,538 A | * | 2/1978 | Hunter | 297/411.38 |
| 4,351,562 A | * | 9/1982 | Twitchell et al. | 297/411.39 X |
| 4,400,033 A | * | 8/1983 | Pietsch | 297/411.39 |
| 4,432,561 A | | 2/1984 | Feikema et al. | |
| 4,466,664 A | * | 8/1984 | Kondou | 297/411.39 |
| 4,496,190 A | * | 1/1985 | Barley | 297/411.38 |
| 4,549,629 A | * | 10/1985 | Komuro | 297/411.32 X |
| 4,570,739 A | | 2/1986 | Kramer | |
| 4,573,549 A | | 3/1986 | Pankow | |
| 4,621,864 A | * | 11/1986 | Hill | 297/411.38 X |

(Continued)

FOREIGN PATENT DOCUMENTS

DE          3539258 A1 *  5/1986  ............ 297/411.32

(Continued)

*Primary Examiner*—Rodney B. White
*Assistant Examiner*—Stephanie N. Harris
(74) *Attorney, Agent, or Firm*—Frijouf, Rust & Pyle, P.A.

(57) ABSTRACT

A retractable armrest is disclosed for a foldable chair. The chair has a seat and a backrest with the backrest being pivotably mounted to the seat by a chair pivot for movement between an operating position and a folded position. A link pivotably operates between armrest and the seat for enabling the armrest to be rotated into the retracted position when the backrest is in the operating position. The link rotates the armrest from the extended position to the retracted position upon the backrest being moved from the operating position to the folded position. The foldable chair is suitable for use on a personal mobility vehicle such as a scooter, a power wheel chair, a foldable personal mobility vehicle or any other suitable chair.

21 Claims, 13 Drawing Sheets

U.S. PATENT DOCUMENTS

| | | | |
|---|---|---|---|
| 4,750,578 A | 6/1988 | Brandenfels | |
| 4,825,971 A | 5/1989 | Bernstein | |
| 4,909,525 A | 3/1990 | Flowers | |
| 4,947,955 A | 8/1990 | Hopely, Jr. | |
| 5,020,624 A | 6/1991 | Nesterick et al. | |
| 5,036,938 A | 8/1991 | Blount et al. | |
| 5,150,762 A | 9/1992 | Stegeman et al. | |
| 5,238,082 A | 8/1993 | Stegeman et al. | |
| 5,265,695 A | 11/1993 | Piazzi | |
| 5,275,465 A * | 1/1994 | Gulliver et al. | 297/411.32 X |
| 5,277,267 A | 1/1994 | Tiffany et al. | |
| 5,312,126 A | 5/1994 | Shortt et al. | |
| 5,328,238 A * | 7/1994 | Yamazaki | 297/378.1 X |
| 5,366,276 A * | 11/1994 | Hobson et al. | 297/411.35 |
| 5,395,160 A * | 3/1995 | Krebs et al. | 297/411.2 |
| 5,695,021 A | 12/1997 | Schaffner et al. | |
| 5,823,624 A * | 10/1998 | Dahlbacka | 297/411.32 X |
| 5,950,755 A * | 9/1999 | Kemmerer et al. | 180/216 |
| 5,979,921 A | 11/1999 | Derven et al. | |
| 6,003,947 A * | 12/1999 | Rye | 297/411.38 |
| 6,047,444 A * | 4/2000 | Braun | 297/411.32 X |
| 6,076,890 A * | 6/2000 | Yoshida et al. | 297/378.12 |
| 6,176,337 B1 | 1/2001 | McConnell et al. | |
| RE37,043 E * | 2/2001 | Yamazaki | 297/378.1 X |
| 6,183,002 B1 | 2/2001 | Choi et al. | |
| 6,186,252 B1 | 2/2001 | Schnaffner et al. | |
| 6,220,616 B1 * | 4/2001 | Finch | 297/411.32 X |
| 6,361,114 B1 * | 3/2002 | Rumler | 297/411.39 |
| 6,428,103 B1 * | 8/2002 | Hong | 297/354.13 |
| 6,739,669 B1 * | 5/2004 | Etzioni et al. | 297/411.32 |
| 6,776,457 B1 * | 8/2004 | Muin et al. | 297/411.32 X |

FOREIGN PATENT DOCUMENTS

| | | | | |
|---|---|---|---|---|
| JP | 56112332 A | * | 9/1981 | 297/411.32 |
| JP | 58224818 A | * | 12/1983 | 297/411.32 |

* cited by examiner

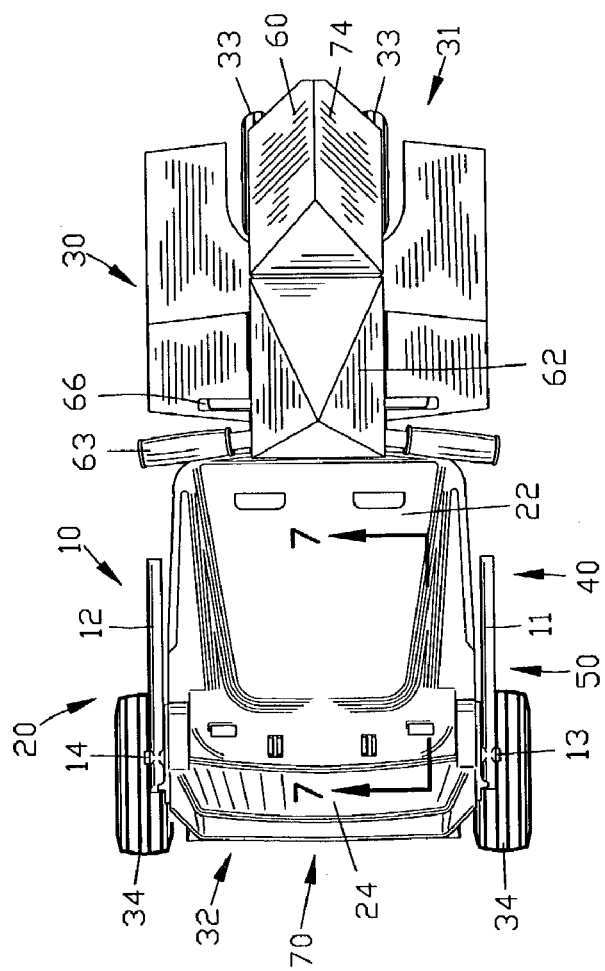
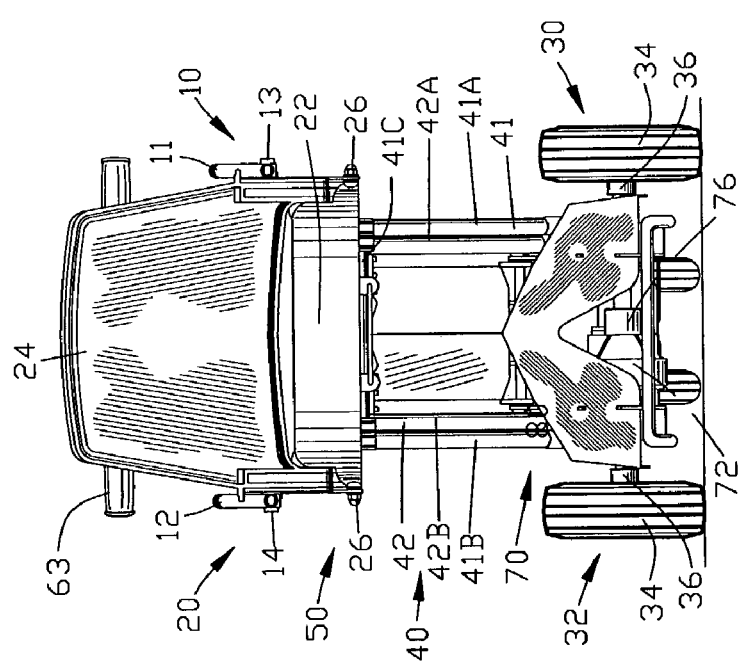

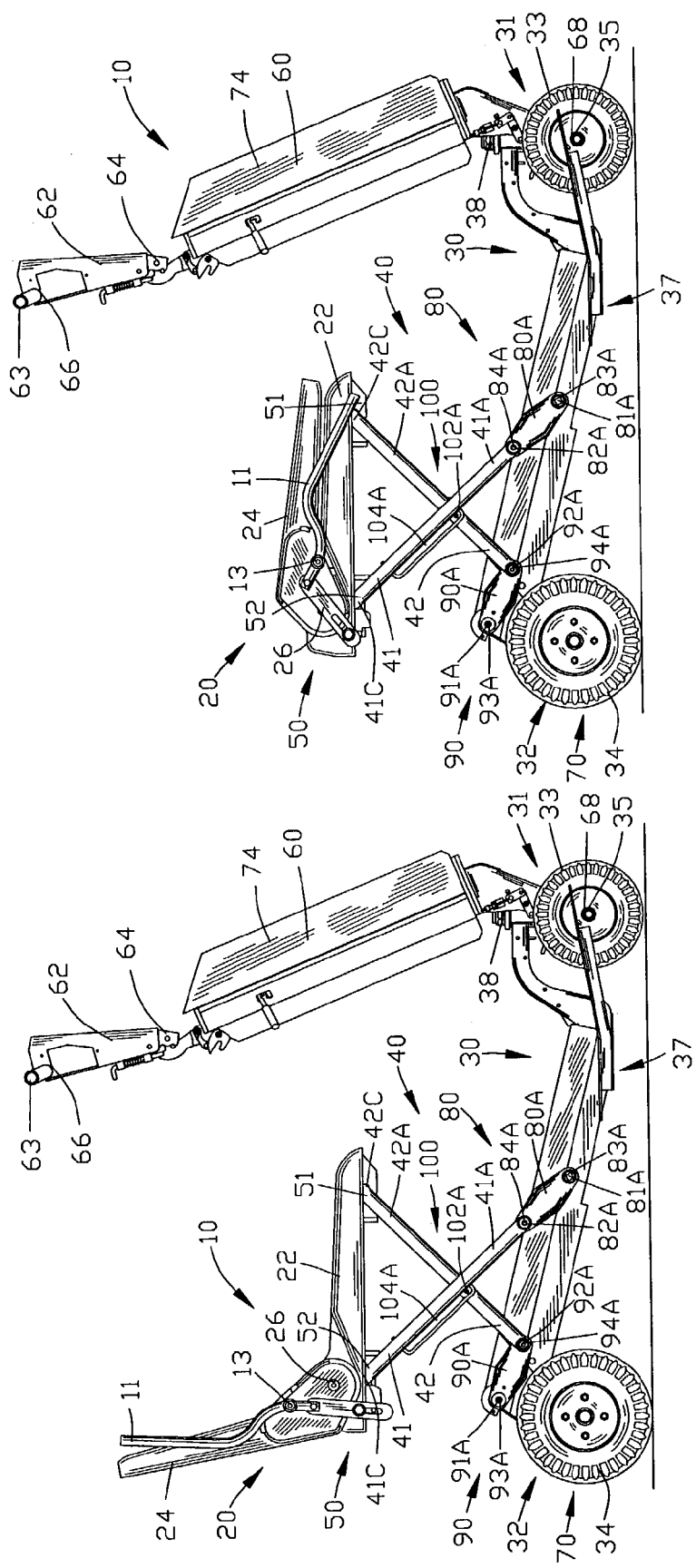

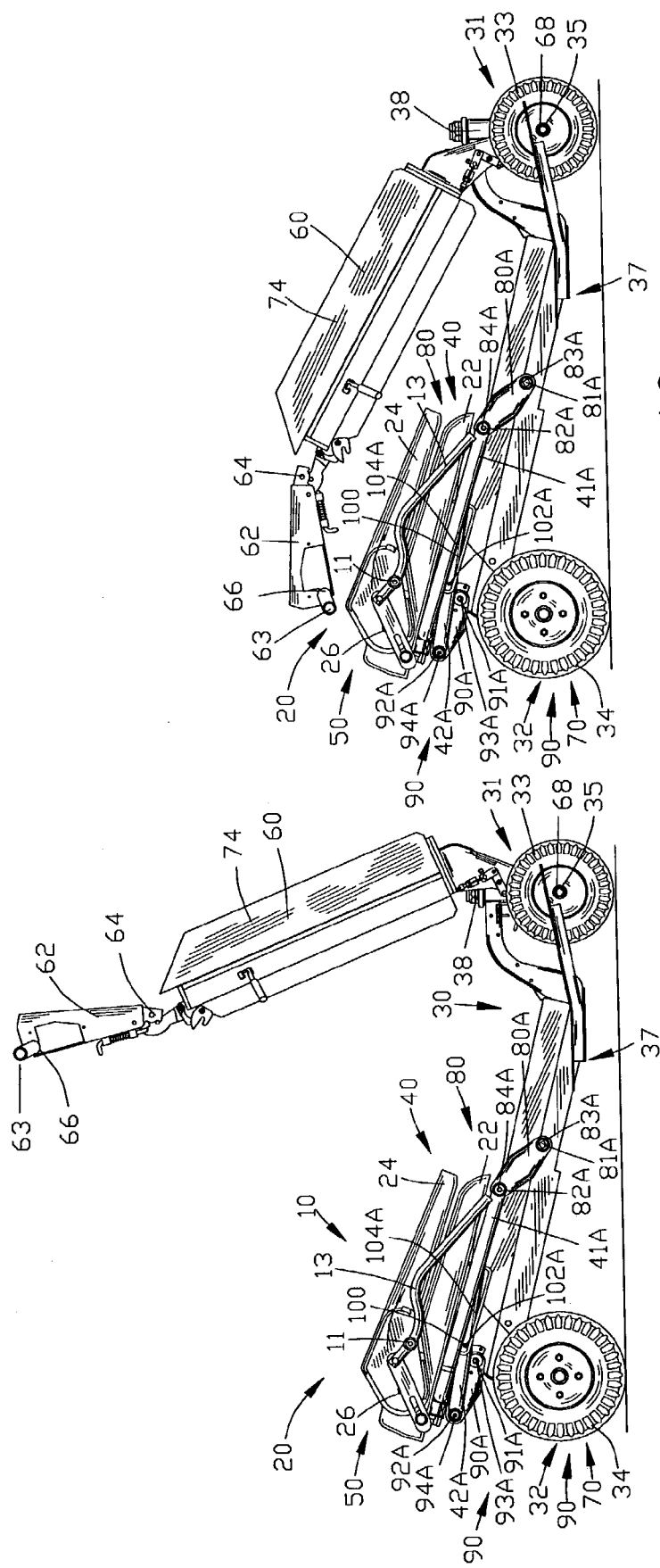

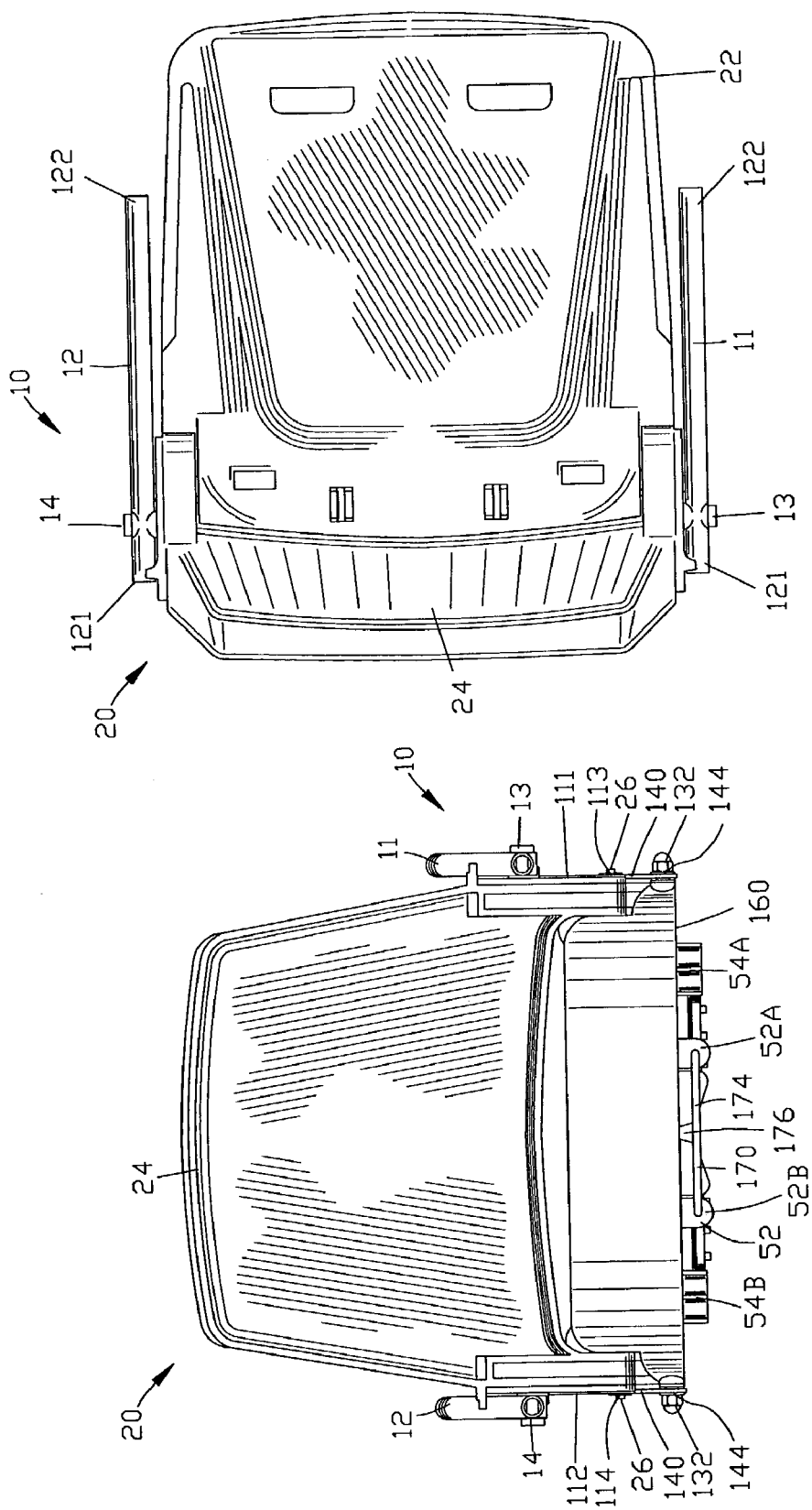

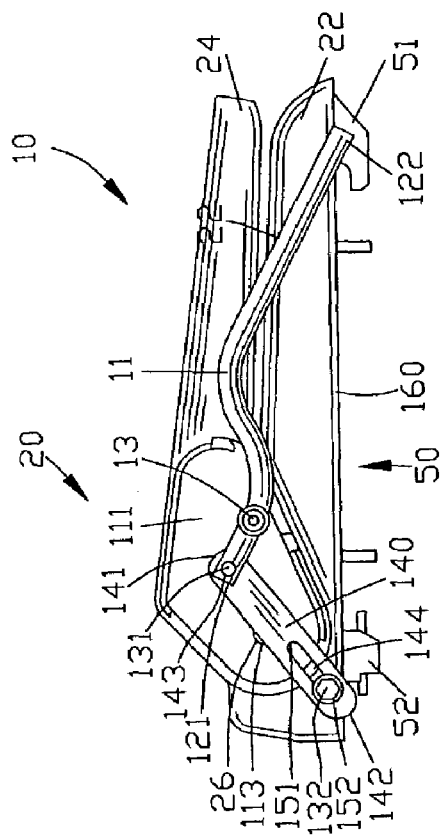
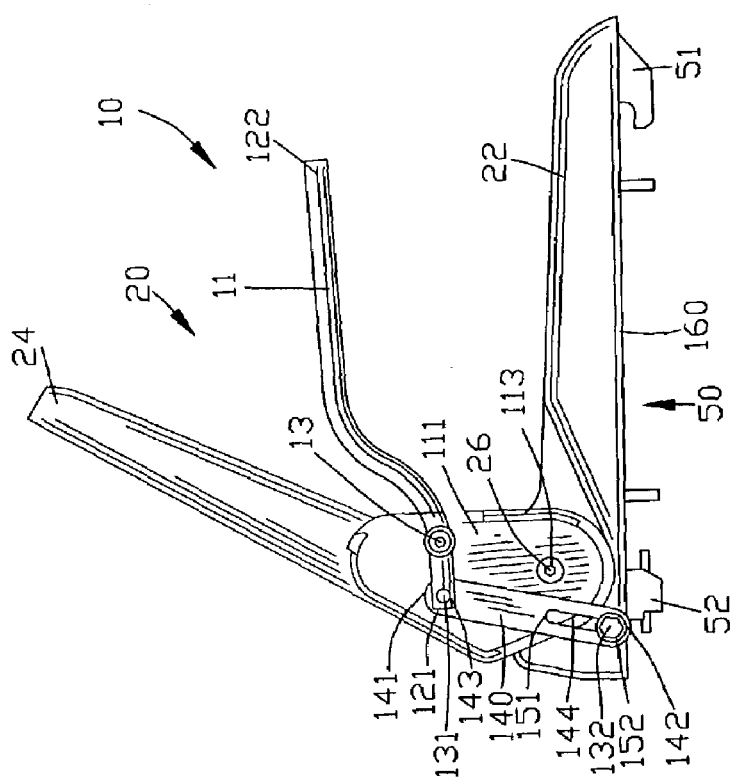
FIG. 18
FIG. 17

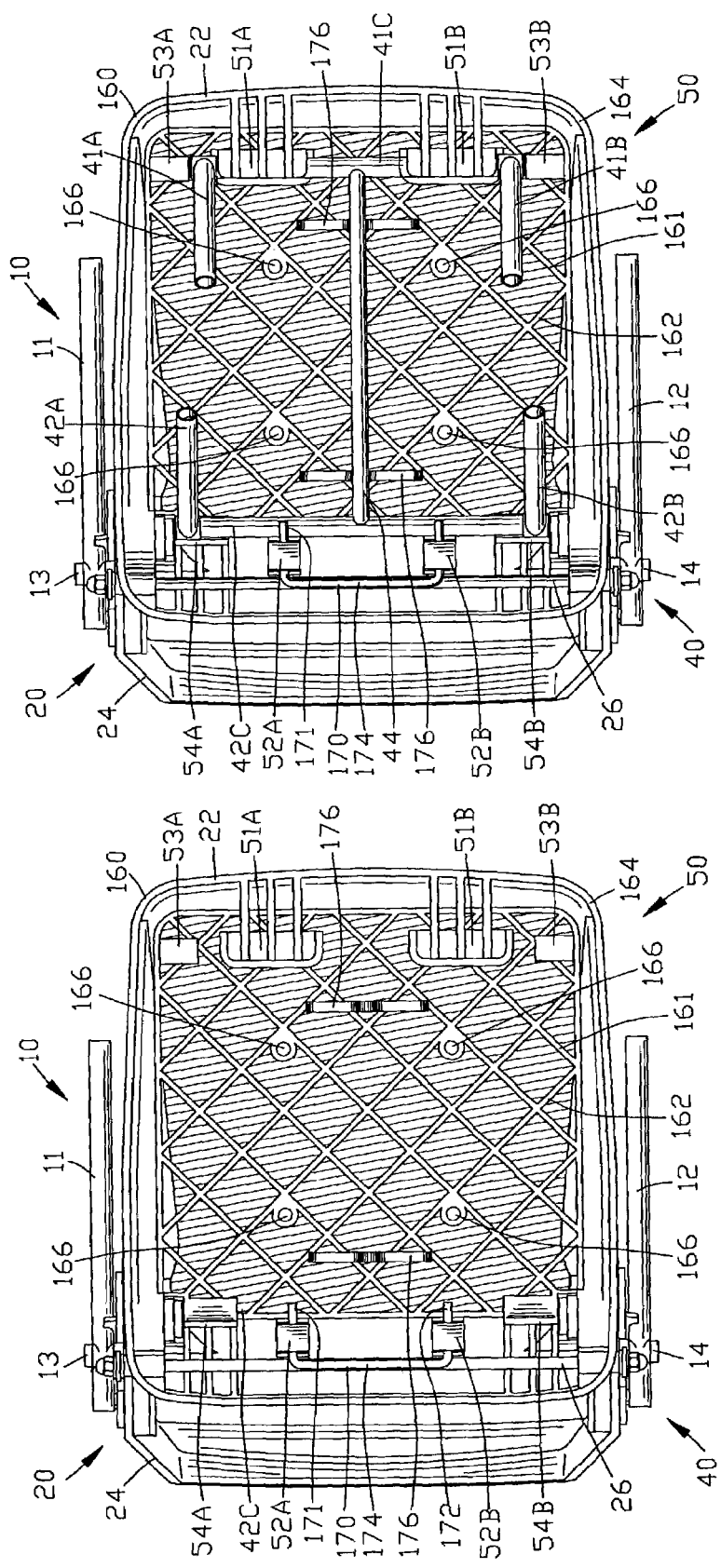

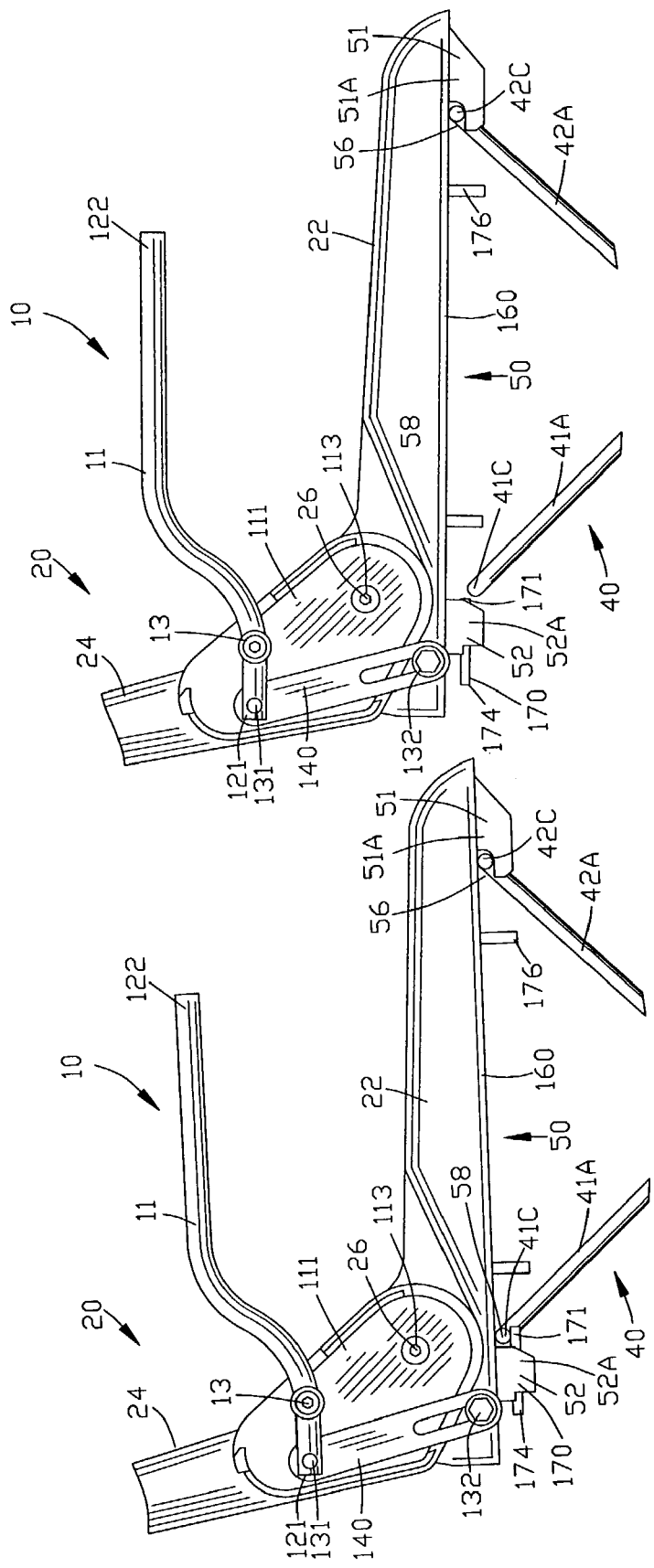

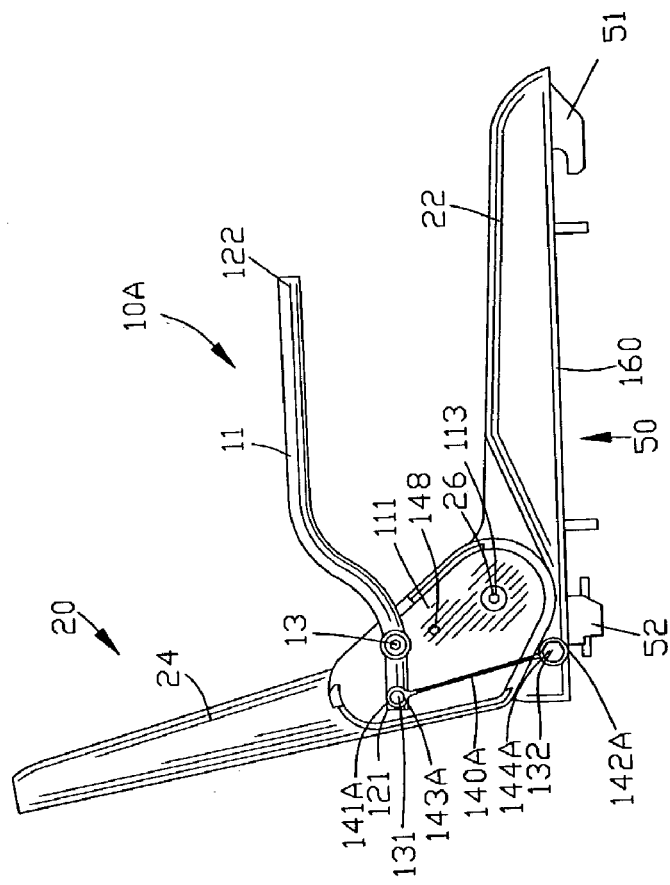
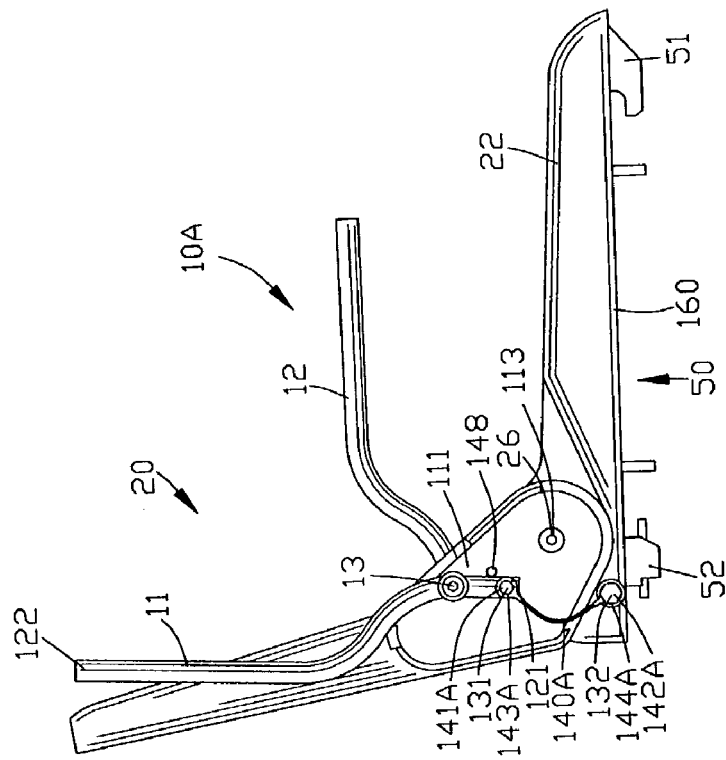
FIG. 23
FIG. 24

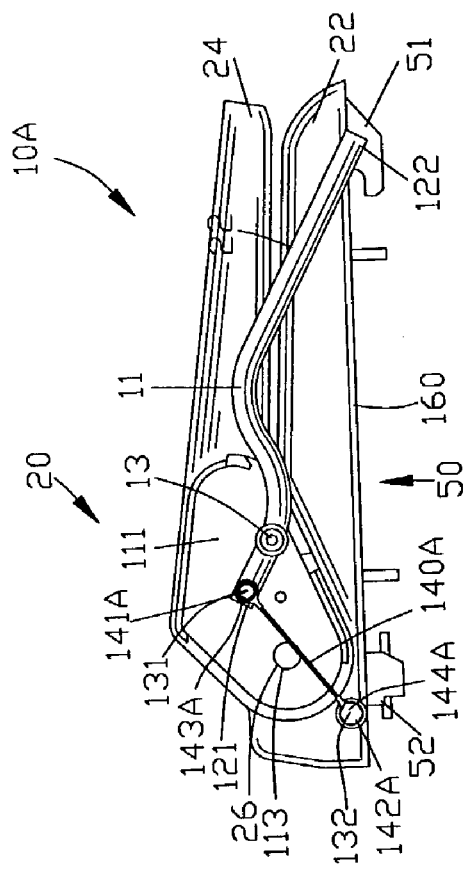
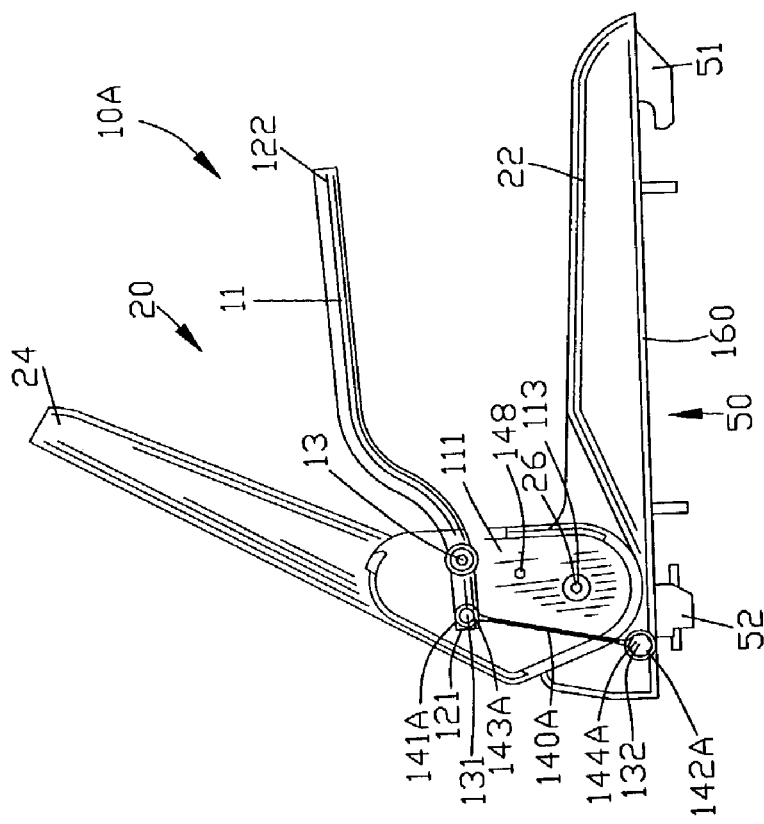
FIG. 25
FIG. 26

FOLDABLE ARMREST FOR CHAIR

BACKGROUND OF THE INVENTION

1. Field of the Invention

This invention relates to seating and more particularly to a retractable armrest for a foldable chair such as a foldable chair of a personal mobility vehicle.

2. Description of the Related Art

The popularity of personal mobility vehicles has dramatically increased over the last several decades. This increase in the popularity of personal mobility vehicles is due to many factors including the advent of new structural techniques and materials.

Although personal mobility vehicles, have provide the desired mobility, the personal mobility vehicles of the prior art suffered from certain disadvantages. Firstly, the personal mobility vehicles of the prior art were difficult to store during nonuse of the personal mobility vehicles. In general, the size of the personal mobility vehicles of the prior art prohibited the storage of the personal mobility vehicles within a closet or a small room. Secondly, the personal mobility vehicles of the prior art were difficult to transport in a conventional automobile. In order to transport a personal mobility vehicle of the prior art in a conventional automobile, the personal mobility vehicle had to be dissembled prior to being placed into the luggage compartment of the conventional automobile.

Thirdly, the personal mobility vehicles of the prior art could be transported in a small truck, small van or a sports utility vehicle in an assembled form. Unfortunately, because of the overall size of the assembled personal mobility vehicles of the prior art, a lift, hoist or two individuals were required in order to transfer the personal mobility vehicle from the ground to the luggage compartment of the small truck, small van or the sports utility vehicle.

Some in the prior art have attempted to solve the problems of the transportation and storage of a personal mobility vehicle by collapsing or folding the personal mobility vehicle. The following U.S. patents are representative of collapsable or foldable personal mobility vehicles.

U.S. Pat. No. 3,004,619 to Straussler discloses a collapsible motor vehicle comprising a chassis having cross members and side members. One of the cross members carries drive wheels and the other cross member carries a steering wheel. A steering column couples a coupling connection from the steering column to the steering wheel. A seat is arranged on the side members. A motor in the chassis is connected to the drive wheels. Each of the side members has a movable section connecting the cross members. Guide means mounts on the side members to enable the movable sections to slide one with respect to the other. Coupling means is mounted on one of the movable sections to enable one of the cross members and one of the movable sections of each of the side members to slide one with respect to the other. Locking means rigidly fixes the movable sections of each side member in a running position of the vehicle, whereupon disengaging the locking means enables the vehicle to be arranged in a collapsed condition with the steering wheel touching the cross member of the drive wheels.

U.S. Pat. No. 3,213,957 to Wrigley discloses a self-propelled wheel chair comprising a seat supporting frame, a pair of rear wheels and a housing rigidly secured to the seat supporting frame. A front wheel in the housing is rotatably mounted to permit steering movement thereof. A drive motor is located in the housing for effecting rotation of the wheel on a horizontal axis to drive the wheel chair. Armrests are rigidly secured to the backrest supporting frame. A pivot connection is located between the back rest supporting frame and the seat supporting frame permitting hinging of the back rest supporting frame forwardly with respect to the seat rest supporting frame from a vertical position into a position in which the back rest supporting frame lies parallel with the seat supporting frame when not in use, a vertically positioned steering column extending into the housing and adapted to be releasably connected at its lower end to the front wheel and having a handle bar at its upper end. The steering column is positioned in front of the seat and centrally located with respect thereto and is removable for access to the chair. A battery supporting frame is positioned beneath the seat supporting frame with switch means controlling the electric motor. Means electrically connect the battery through the switch means to the electric motor. The steering column has a control rod extending centrally there through with the lower end of the control rod adapted releasably to engage the switch means to actuate the latter. A control lever is pivotally mounted to the column adjacent the handle bar and is operably connected to the control rod for actuation thereof. A latch mechanism is removably secured to the steering column in operable position.

U.S. Pat. No. 3,369,629 to Weiss discloses a self-propelled vehicle which has a seat and backrest independently foldable forwardly. A steering column is foldable rearwardly over the folded seat and backrest to achieve a small package for storage and transportation.

U.S. Pat. No. 3,580,348 to Di Blasi et al. discloses a collapsible frame for wheeled vehicles, comprising a main structure to which rear forks are pivoted and carry wheels, a front footboard carrying a steering wheel, and a seat. The forks, footboard and seat are clampable to an open position where the frame is at running conditions and are operable to assume a closed position where the forks and footboard enter the main structure on which the seat can be overturned, in this case the frame occupying a rather reduced volume or space.

U.S. Pat. No. 4,026,573 to Richardson discloses a portable foldable motor scooter with a substantially triangular chassis, each corner of which is pivotable and one leg of which is hinged to allow the chassis to be folded to a collapsed condition. A steering column is pivotally connected to the forward corner of the chassis and is detachable from the chassis. The driver's seat is supported on front and rear linkages, the front linkage including a triangular portion containing the leg hinge of the chassis. A single removable pin normally locks this hinge and maintains the front seat-supporting linkage rigid. Upon removal of the pin the chassis can be folded to its collapsed position and the seat can be swung downwardly toward the rear wheel and can be latched to the rear wheel fender, holding the chassis in its collapsed position. The steering column has handle bars which can be swung inwardly and fastened so as not to protrude from the folded vehicle.

U.S. Pat. No. 4,570,739 to Kramer discloses a personal mobility vehicle including a floor pan with a rear drive unit at one end and a steerable front wheel at the other end. The drive unit is separable from the floor pan and includes spaced apart, differentially connected rear wheels, an electric motor, and belts and pulleys drivingly connecting the motor to a differential unit. The front wheel is steered by a tiller. A seat with a folding back is removably connected to the floor pan toward the pan rear end to concentrate the weight of the driver over the rear wheels to aid in traction.

A brake is provided on the front wheel and is lockable for parking purposes. Each of the drive unit, seat unit, a battery, and a floor pan unit weighs less than thirty pounds such that the separated components can be easily lifted and manipulated for transportation of the vehicle between sites of use.

U.S. Pat. No. 4,573,549 to Pankow discloses a golf car apparatus including a frame supported off the surface of the ground by at least three wheels, two of the wheels being positioned near the back end of the frame and being interconnected by an axle. DC batteries interconnected to an electrical motor are utilized to power golf car apparatus. A drive mechanism is interconnected to the electrical motor and a differential mechanism positioned near the center of the axle interconnecting the two rear wheels. Foot support means is defined by the frame on either side of the differential mechanism and extend under the axle for positioning of a user's feet such that when the user is standing on the golf car apparatus the user's feet extend at least partially under the axle so as to provide the golf car apparatus with a low center of gravity and a center of gravity distributed between the front and rear wheels.

U.S. Pat. No. 4,750,578 to Brandenfels discloses a chassis member with rear wheels and a battery compartment having a detachable connection with an upright front wheeled support. The front wheeled support has a steering handle assembly pivotally connected thereto which can be locked in upright position or swung rearwardly into a folded position parallel with the front wheeled support, or pivoted forwardly for use as a dolly-type handle. An electric motor is mounted on the front wheel support and has lead wires to the battery and to a switch operated by a belt tightener providing driving power when a hand lever is depressed but providing free wheeling when the lever is released. The lead wires for the battery are of a length and have disconnects which allow the battery to be carried on the person if desired. The cart is adapted to receive a removable seat and when knocked down consists of the chassis member, the front wheeled support, the battery, and the seat if the latter is used. The cart can be used to transport a person either in a sit down or stand up position, it has luggage carrying arms on the front wheeled support, it can be used as a dolly with or without power from the battery, and importantly, each of the dismantled parts are small and light enough for easy carrying but most persons and capable of being stored in overhead airplane or other vehicle storage areas.

U.S. Pat. No. 4,825,971 to Bernstein discloses a lightweight universal electric wheeled chair formed of hollow tubular frame members. The seat is preferably cantilevered from rear frame members. The frame includes two lower side frame members, each of which has relatively small wheels mounted at both ends. The frame also includes two rear frame members, pivotally connected together intermediate their ends to form an "X" configuration with the lower ends of each of the rear frame members being pivotally secured to the rear ends of the lower side frame members. The front of the two lower side members are coupled together using two frame members and linear bearings intercoupling the two frame members to permit adjustment and collapsing of the wheeled chair. Two upper side members extend forwardly from the rear of the wheeled chair, and are secured to the rear frame members. A seat may be supported directly on these two upper side frame members, or the two upper side frame members may serve as arms for the wheeled chair, with the seat being slung from these arms at a lower position. Motor and gearing arrangements are provided for varying the distance between the two side members to change the height of the seat. When the lower side members are at their maximum separation, the pivoted rear frame members are very nearly parallel and horizontal. Nickel-cadmium batteries may be mounted in the tubular frame of the wheeled chair, and each of the rear wheels is provided with a small electric motor, aligned with and coupled to each rear wheel through appropriate gear reduction assemblies.

U.S. Pat. No. 4,909,525 to Flowers discloses a personal mobility vehicle comprising front and rear frame sections which can be disassembled and assembled. The frame sections are secured together by a pivotable detachable connection such that the rear frame section is lockingly received in the rear portion of the front frame section and the length of the assembled frame is substantially the same as the length of the front frame section itself. An auxiliary frame section is also provided which can be readily attached to the powered rear frame section to provide improved mobility in those situations in which space for turning is limited.

U.S. Pat. No. 4,947,955 to Hopely discloses a personal mobility vehicle comprising front and rear frame sections which can be disassembled and assembled. The frame sections are secured together by a pivotable detachable connection such that the rear frame section is lockingly received in the rear portion of the front frame section and the length of the assembled frame is substantially the same as the length of the front frame section itself.

U.S. Pat. No. 5,020,624 to Nesterick et al. discloses a modular power drive scooter, including as modular components a seat, a seat post, a mainframe, a trailer and at least one battery and is built in a manner allowing quick and easy disassembly of the scooter for compact storage. In assembled form, the seat post supports the seat and also serves as a lock pin which prevents separation of the mainframe from the trailer. The mainframe includes a front wheel, a tiller assembly for steering the scooter, and recesses for accommodating one or more batteries. The trailer includes a pair of rear wheels coupled to a differential which is driven by an electric motor, and a removable storage tray that provides access to the motor. A stem member extending from the trailer engages the mainframe in an overlapping relation whereby apertures in the stem member align with ports in the mainframe. The seat post is inserted into a selected port to determine the spacing of the seat from the tiller assembly. Removal of the seat post from an aligned aperture and port enables the mainframe and the trailer to be separated by pulling a first handle located on the stem member to pivot the trailer relative to the mainframe, and then by lifting the mainframe by a second handle to disengage coupling hooks on the mainframe from a coupling rod of the trailer.

U.S. Pat. No. 5,036,938 to Blount et al. discloses a riding scooter that may be assembled and disassembled without the use of tools formed of components of a size and weight that may be handled by a person of modest physical strength. The scooter's front and rear sections have overlapping interengaging parts that are biased together in the operative position by the weight of the sections alone. Batteries for electrical power are contained within casings which are cooperatively retained within a battery housing and which also permit the batteries to be simultaneously electrically connected to the vehicle electrical system upon insertion of the battery casings within the battery housing. A steering tiller is detachably mounted to the front steering yoke being retained in an operative position by a quick release locking collar. Control for forward and reverse movement is accomplished through linkage which permits convenient manipulation of the control handle while providing maximum adjustment of an electric potentiometer which controls the electric motor; and, the seat assembly is designed to retain a selected adjustment from disassembly to assembly and further acts to reinforce the biased engagement of the front and rear sections of the scooter.

U.S. Pat. No. 5,150,762 to Stegeman et al. discloses a personal mobility vehicle including front and rear frames which are connected together in use. The rear frame supports the rear axle and drive wheels, as well as the electric motor/brake system. The front frame supports a front wheel spindle to which one or more front wheels are attached. A tiller is mounted to the front spindle, the tiller being collapsible for storage of the vehicle. A seat post is mounted to the front frame for supporting a removable seat, and a floor pan is mounted to the front frame to support the vehicular batteries, as well provide a foot rest for the rider. The front and rear frames are preferably connected together with a plate having a depending J-hook arranged to engage a plate having a depending lip. A latch and latch receiver serve to lock the connection together with the plates bearing against each other in compression to support the vehicle and rider. The tiller is preferably positionable in a plurality of lock positions, including one collapsed position for compact storage.

U.S. Pat. No. 5,238,082 to Stegeman et al. discloses a personal mobility vehicle including front and rear frames which are connected together in use. The rear frame supports the rear axle and drive wheels, as well as the electric motor/brake system. The front frame supports a front wheel spindle to which one or more front wheels are attached. A tiller is mounted to the front spindle, the tiller being collapsible for storage of the vehicle. A seat post is mounted to the front frame for supporting a removable seat, and a floor pan is mounted to the front frame to support the vehicular batteries, as well provide a foot rest for the rider. The front and rear frames are preferably connected together with a plate having a depending J-hook arranged to engage a plate having a depending lip. A latch and latch receiver serve to lock the connection together with the plates bearing against each other in compression to support the vehicle and rider. The tiller is preferably positionable in a plurality of lock positions, including one collapsed position for compact storage.

U.S. Pat. No. 5,265,695 to Piazzi discloses a portable collapsible golf cart vehicle adapted for use on a golf fairway and collapsible for storage and transport. A scooter-type vehicle having a steering mechanism and rear propelling mechanism in which the steering mechanism includes a steering column coupled with a steering handle for rotation of the steering column. A pivotal connection is provided for pivotally connecting and locking the steering mechanism in one position during propelling of the vehicle and in another position for storage of the vehicle. The mechanism includes a pivotal unit and a rear wheel with the pivotal unit being in a first position for use in a scooter vehicle and in a second position for storage in the compact condition.

U.S. Pat. No. 5,277,267 to Tiffany et al. discloses a collapsible, portable golf cart including a main frame assembly and a wheel assembly operatively connected to the main frame assembly for movement of the main frame assembly along a surface. The golf cart further includes a collapsible support assembly operatively connected to the main frame assembly for selective movement between an erected position and a collapsed position relative to the main frame assembly. A seating member for a cart rider is operatively connected to the collapsible support means for movement with the collapsible support means between the above mentioned positions.

U.S. Pat. No. 5,312,126 to Shortt et al. discloses a light, portable golf riding apparatus that may be electric motor or pedal driven. The lightness of the apparatus is provided in part by using a tubular construction, with few, if any, panels, and portability is provided by having the apparatus formed from several sections or frameworks pivoting in relation to each other. In one embodiment, a first central section holds the power train and rear wheels, a front section holds the steering column, and a third a seat for the rider. The central and front sections pivot towards each other, the seat folds onto the central section and the steering collapses about the apparatus to form a compact body.

U.S. Pat. No. 5,695,021 to Schaffner et al. discloses an electrically-powered scooter vehicle for use by elderly, disabled and infirm people and including a self-locking connection means for connecting front and rear frame portions of the scooter. The scooter is convertible between three-wheel and four-wheel versions without use of tools. Automatic shut-off circuitry minimizes inadvertent loss of battery power due to failure to turn off the scooter. An adjustably lockable telescoping tiller facilitates use of the scooter by persons of all sizes.

U.S. Pat. No. 5,979,921 to Derven et al. discloses a folding bicycle trailer including a body portion having a passenger-receiving area, axle mounts, tongue mounts, and canopy mounts. The body portion is a unitary, one-piece monocoque structure, with the mounts being integrally formed therewith. An axle member is secured to the axle mount and carries wheel supports on each end thereof. The wheel supports are shiftable between an operable, extended position and a folded, storage position. A wheel is carried on each wheel support for free rotation relative thereto. An elongate tongue is carried on the tongue mount and extends forward from the body portion. A canopy frame, including fore and aft canopy members, is mounted on the body portion and is shiftable between a collapsible condition and a raised condition.

U.S. Pat. No. 6,176,337 B1 to McConnell et al. discloses a personal mobility vehicle having front and rear chassis members interconnected by a locking means. The rear chassis member includes alignment means for aligning the rear chassis with a suspension assembly of the front chassis. An adjustable seat assembly supports a user while preventing accidental disengagement of the locking means.

U.S. Pat. No. 6,183,002 B1 to Choi et al. discloses a wheelchair having a seat and a plurality of wheels for rolling the wheelchair along a ground surface. The seat includes a seat bottom and a seat back pivotally coupled to the seat bottom. The seat back is movable between a folded position and an unfolded position. The seat bottom has a back end formed from a first curved shape, and the seat back has a bottom end formed from a second curved shape. The first curved shape of the seat bottom is sized to mate with the second curved shape of the seat back when the seat back is in the unfolded position. A motor coupled to each rear wheel and a control stick is in communication with each motor for independently operating each of the motors to drive and steer the wheel chair.

U.S. Pat. No. 6,186,252 B1 to Schaffner et al. discloses a power chair comprising a frame transversely foldable between operating and transport positions. A seat is connected to the frame, with a pair of drive wheels also connected to the frame. The drive wheels are rotatable about a transverse axis below a portion of the seat supporting an occupant's thighs. The power chair further includes motors for driving respective drive wheels. Perspective motor/drive wheel combinations are pivotally connected to the frame. At least one ground-engaging idler wheel is connected to the frame, located rearward of the drive wheels. At least one anti-tip wheel is positioned above ground, forward of the drive wheels, and connected to the frame for movement relative to the frame upon encountering an obstacle.

In many personal mobility vehicles, it is desirable for a chair to be foldable for easy transportation and/or storage. Furthermore, it is very desirable for the chair to be folded rapidly for easy and efficient transportation in a conventional vehicle such as an automobile, minivan, boat or airplane.

Typically, the chair has a seat and a backrest with the backrest being pivotably mounted to the seat by a chair pivot. The backrest is movable on the chair pivot between an operating position whereat the backrest is in a position generally perpendicular to the seat and a folded position whereat the backrest is in a position generally parallel to the seat.

Some chairs of personal mobility vehicles are provided with armrests for the convenience and the comfort of the occupant of the chair. When the chair was provided with an armrest, the armrest had to be manually retracted or manually removed from the chair prior to the chair being moved into the folded position. The manual retraction or manual removal of the armrest from the chair prior to the chair being pivoted into the folded position added to the complexity of the disassembly and/or transportation of the personal mobility vehicle.

Therefore, it is an object of the invention to provide a retractable armrest for a foldable chair that overcomes the inadequacies of the prior art and provides a significant contribution to the art.

Another object of the present invention is to provide a retractable armrest for a foldable chair that enables the armrest to be rotated into the retracted position when the backrest is in the operating position.

Another object of the present invention is to provide a retractable armrest for a foldable chair that rotates the armrest from the extended position to the retracted position upon the backrest being moved from the operating position to the folded position.

Another object of the present invention is to provide a retractable armrest for a foldable chair that is suitable for use with a scooter, a power wheel chair, a foldable personal mobility vehicle or any other suitable chair.

Another object of the present invention is to provide a retractable armrest for a foldable chair that is suitable for use with a collapsing seat of a foldable personal mobility vehicle.

Another object of the present invention is to provide a retractable armrest for a foldable chair that may be removed easily from the personal mobility vehicle.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to a retractable armrest for a foldable chair. The chair has a seat and a backrest with the backrest being pivotably mounted to the seat by a chair pivot for movement between an operating position and a folded position. The retractable armrest is pivotably mounted for rotational movement between an extended position and a retracted position. A first pivot is located on the armrest with a second pivot being located on the seat. A link operates between the first pivot and the second pivot for enabling the armrest to be rotated into the retracted position when the backrest is in the operating position. The link rotates the armrest from the extended position to the retracted position upon the backrest being moved from the operating position to the folded position. The foldable chair is suitable for use on a personal mobility vehicle such as a scooter, a power wheel chair a foldable personal mobility vehicle or any other suitable chair.

In a more specific example of the invention, the backrest is pivotably mounted to the seat for movement between the operating position whereat the backrest is in a position generally perpendicular to the seat and the folded position whereat the backrest is in a position generally parallel to the seat. The armrest extends between a first and a second end. An armrest pivot mounts the armrest relative to the backrest for rotating the armrest between the extended position whereat the armrest is located generally perpendicular to the backrest and the retracted position whereat the armrest is located generally parallel to the backrest. The second end of the armrest provides an arm support for an occupant of the chair. The first pivot is located at the first end of the armrest whereas the second pivot is located on the seat. The link operates between the first pivot and the second pivot for enabling the armrest to be rotated into the retracted position when the backrest is in the operating position. The link rotates the armrest from the extended position to the retracted position upon the backrest being moved from the operating position to the folded position.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which:

FIG. 3 is a rear view of FIG. 1;

FIG. 4 is a top view of FIG. 1;

FIG. 5 is a side view similar to FIG. 1 illustrating an armrest being pivoted into a retracted position and with the backrest being located in an operating position with a handlebar of the foldable personal mobility vehicle being raised for facilitating ingress and egress from the foldable personal mobility vehicle;

FIG. 6 is a side view similar to FIG. 5 illustrating the backrest being pivoted into a folded position;

FIG. 9 is a side view similar to FIG. 8 illustrating the complete lowering of the foldable chair on the foldable personal mobility vehicle;

FIG. 10 is a side view similar to FIG. 9 illustrating the folding of the foldable personal mobility vehicle;

FIG. 13 is a rear view of FIG. 11;

FIG. 14 is a top view of FIG. 11;

FIG. 17 is a view similar to FIG. 16 illustrating the partial movement of the backrest toward the folded position for partially pivoting the retractable armrests toward the retracted position;

FIG. 18 is a view similar to FIG. 17 illustrating the complete movement of the backrest into the folded position for pivoting the armrests into the retracted position;

FIG. 19 is a bottom view of FIG. 11 with the chair removed from the personal mobility vehicle;

FIG. 20 is a view similar to FIG. 19 with the chair secured to the personal mobility vehicle;

FIG. 21 is a magnified side view of the chair being secured to the chair support;

FIG. 22 is a view similar to FIG. 21 with the chair being removed from the chair support;

FIG. 23 is an enlarged view of the foldable chair of FIG. 1 with the backrest located in an operating position and illustrating an alternate embodiment of the foldable armrest;

FIG. 24 is a view similar to FIG. 23 illustrating the backrest located in an operating position and with both of the retractable armrests located in the extended position;

FIG. 25 is a view similar to FIG. 24 illustrating the partial movement of the backrest toward the folded position for partially pivoting the retractable armrests toward the retracted position; and FIG. 26 is a view similar to FIG. 24 illustrating the complete movement of the backrest into the folded position for pivoting the armrests into the retracted position.

Similar reference characters refer to similar parts throughout the several Figures of the drawings.

DETAILED DISCUSSION

Figure 2:
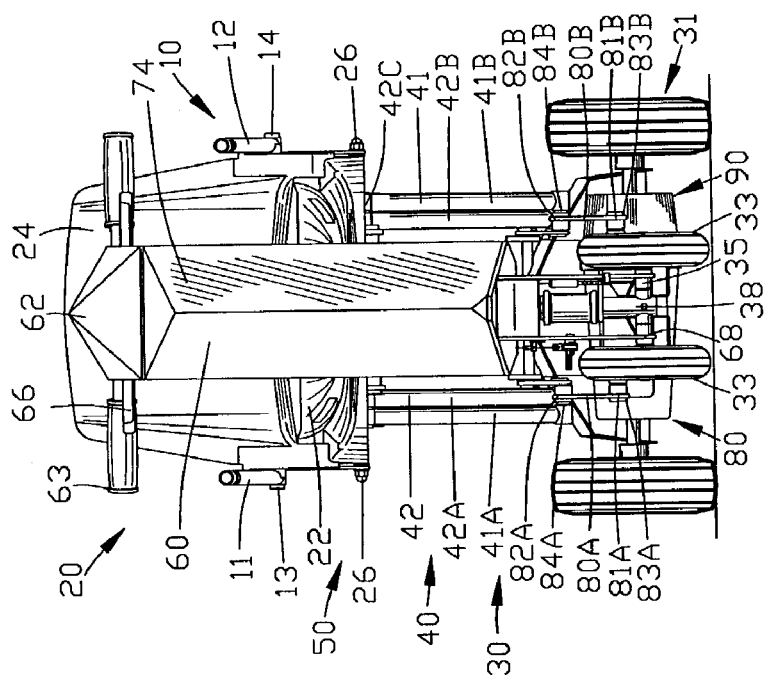
FIG. 2 is a front view of FIG. 1.

FIGS. 1–4 illustrate various views of a retractable armrest 10 for a foldable chair 20 incorporating the present invention. In this example, the foldable chair 20 is shown attached to a personal mobility vehicle 30 for transporting an operator. Although the retractable armrest 10 for the foldable chair 20 is shown associated with a personal mobility vehicle 30, it should be appreciated by those skilled in the art that the retractable armrest 10 for the foldable chair 20 may be applied to other suitable applications disassociated with a personal mobility vehicle 30.

The personal mobility vehicle 30 may be a manual personal mobility vehicle or an electrically powered personal mobility vehicle such as power wheel chair, a scooter or any other suitable vehicle. In this example, the personal mobility vehicle 30 is shown as a foldable personal mobility vehicle 30 but it should be appreciated by those skilled in the art that the personal mobility vehicle 30 may be a conventional personal mobility vehicle 30.

The foldable chair 20 is supported by a chair support 40 extending from the personal mobility vehicle 30. In this example of the invention, the chair support 40 is shown as a foldable support 40 for movement between a raised position and a lowered position.

A chair coupling 50 secures the chair 30 to the chair support 40. In this embodiment of the invention, the chair coupling 50 removably secures the chair 30 to the chair support 40 but it should be understood that the chair coupling 50 may be permanently secure the chair 30 to the chair support 40.

The foldable chair 20 comprises a seat 22 with a backrest 24 pivotably mounted to the seat 22 by a chair pivot 26. The backrest 24 is pivotably mounted to the seat 22 by the chair pivot 26 for movement between an operating position shown in FIGS. 1–4 and a folded position shown in FIGS. 6–10. When the backrest 24 is pivoted into operating position, the backrest 24 is in a position generally perpendicular to the seat 22. When the backrest 24 is pivoted into folded position, the backrest 24 is in a position generally parallel to the seat 22.

Figure 1:
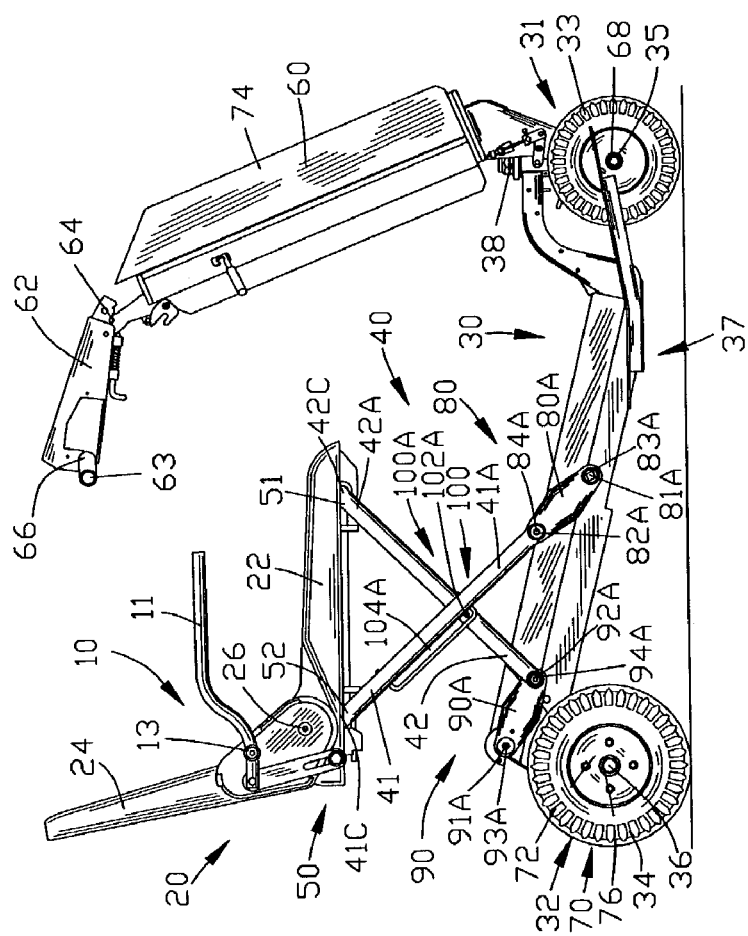
FIG. 1 is a side view of a retractable armrest for a foldable chair of the present invention mounted upon a foldable personal mobility vehicle with the armrest being rotated into an extended position.

The retractable armrest 10 comprises plural armrests 11 and 12 located on opposed sides of the foldable chair 20. The plural armrests 11 and 12 are pivotably mounted to the foldable chair 20 by plural armrests pivots 13 and 14. The retractable armrests 11 and 12 are pivotably mounted for movement between an extended position as shown in FIG. 1 and a retraced position as shown in FIG. 5.

The personal mobility vehicle 30 comprises a front unit 31 and a rear unit 32 having plural front wheels 33 and plural rear wheels 34. The plural front wheels 33 are rotatable about a front axle 35 whereas the plural rear wheels 34 are rotatable about a rear axle 36. The front axle 35 is substantially parallel to the rear axle 36. As will be described in greater detail hereinafter, a folding pivot 37 pivotably mounts the front unit 31 to the rear unit 32 for enabling the folding of the personal mobility vehicle 30. The plural front wheels 33 are pivotably mounted to the front unit 31 on a pivot 38 for adjusting the angular position of the front wheel 33.

A tiller unit 60 includes handlebar unit 62 having handlebars 63. The handlebar unit 62 is pivotably mounted to the tiller unit 60 by a handlebar pivot 64. The handlebar unit 62 supports a control switch 66 for enabling an operator to control the electrical system of the personal mobility vehicle 30. The tiller unit 60 is connected to the plural front wheels 33 for enabling an operator to rotate the plural front wheels 33 on the pivot 38 for steering foldable personal mobility vehicle 30.

In this example, the tiller unit 60 is pivotably connected to the plural front wheels 33 by a pivot 68. As will be described in greater detail hereinafter, the pivot 68 enables the tiller unit 60 to be folded in a contracted condition for the transportation and storage of the foldable personal mobility vehicle 10.

The personal mobility vehicle 30 includes a drive unit 70 for rotating the plural rear wheels 34 for moving the foldable personal mobility vehicle 30. The drive unit 70 may be of conventional design comprising an electric motor 72 powered by a battery pack 74 for driving the plural rear wheels 34 through a transmission 76. The drive unit 70 is connected to the control switch 66 located on the handlebar unit 62 for enable an operator to control the speed and direction of the plural rear wheels 34.

The foldable chair 20 is supported by the chair support 40 extending from the personal mobility vehicle 30. In this embodiment of the invention, the chair coupling 50 removably secures the chair 30 to the chair support 40. In this example of the invention, the chair support 40 is shown as a foldable support 40 for movement between a raised position and a lowered position.

The chair support 40 comprises a first and a second U-shape support 41 and 42. The first U-shape support 41 is pivotably connected to the personal mobility vehicle 30 by a first pivot 80. Similarly, the second U-shape support 42 is pivotably connected to the personal mobility vehicle 30 by a second pivot 90. The first U-shape support 41 is pivotably connected to the second U-shape support 42 by a third pivot 100. The chair coupling 50 pivotably connects the first and second U-shape supports 41 and 42 to the foldable chair 20. The first and second U-shape support 41 and 42 in combination with the third pivot 100 form a scissor type support 40.

The first U-shape support 41 defines plural first legs 41A and 41B interconnected by a central leg 41C. The second U-shape support 42 defines plural second legs 42A and 42B interconnected by a central leg 42C.

The first pivot 80 comprises plural first pivot arms 80A and 80B pivotably connecting the plural first legs 41A and 41B of the first U-shape support 41 to the personal mobility vehicle 30. Similarly, the second pivot 90 comprises plural second pivot arms 90A and 90B pivotably connecting the plural second legs 42A and 42B of the second U-shape support 42 to the personal mobility vehicle 30.

The first pivot arm 80A extends between opposed mounting ends 81A and 82A. Pivots 83A and 84A are located at the opposed mounting ends 81A and 82A of the first pivot arm 80A. The mounting end 81A of the first pivot arm 80A is pivotably mounted to the personal mobility vehicle 30 by the pivot 83A. The mounting end 82A of the first pivot arm 80A is pivotably mounted to the first leg 41A of the first U-shape support 41 by the pivot 84A.

The first pivot arm 80B is identical to the first pivot arm 80A. The first pivot arm 80B pivotably connects the first leg 41B of the first U-shape support 41 to the personal mobility vehicle 30 in a manner similar to the first pivot arm 80A.

The second pivot arm 90A extends between opposed mounting ends 91A and 92A. Pivots 93A and 94A are located at the opposed mounting ends 91A and 92AB of the second pivot arm 90A. The mounting end 91A of the second pivot arm 90A is pivotably mounted to the personal mobility vehicle 30 by the pivot 93A. The mounting end 92A of the second pivot arm 90A is pivotably mounted to the second support leg 42A of the second U-shape support 42 by the pivot 94A.

The second pivot arm 90B is identical to the second pivot arm 90A. The second pivot arm 90B pivotably connects the second leg 42B of the second U-shape support 42 to the personal mobility vehicle 30 in a manner similar to the second pivot arm 90A.

The first U-shape support 41 is pivotably connected to the second U-shape support 42 by a third pivot 100. The first leg 41A of the first U-shape support 41 is interconnected to the second leg 42A of the second U-shape support 42 by a third pivot 100A. Similarly, the first leg 41B of the first U-shape support 41 is interconnected to the second leg 42B of the second U-shape support 42 by a third pivot 100B.

In this example of the invention, the third pivot 100A comprises a pivot pin 102A extending from the second leg 42A of the second U-shape support 42 for cooperation with an elongated aperture 104A defined by the first leg 41A of the first U-shape support 41. The pivot pin 102A extends into the elongated aperture 104A for providing a sliding and pivoting interconnecting third pivot 100A. The first leg 41B of the first U-shape support 41 is interconnected to the second leg 42B of the second U-shape support 42 by the third pivot 100B in a manner similar to the third pivot 100A.

The chair coupling 50 connects the first and second U-shape supports 41 and 42 to the foldable chair 20. The chair coupling 50 comprises a front receiver 51 and a rear receiver 52 for receiving the first and second central legs 41C and 42C of the first and second U-shape supports 41 and 42. As will be described in greater detail hereinafter, the front and rear receivers 51 and 52 removably mount the foldable chair 20 to the chair support 40.

FIG. 5 is a side view similar to FIG. 1 illustrating the backrest 24 located in an operating position with the backrest 24 being in a position generally perpendicular to the seat 22. In contrast to FIG. 1, the retractable armrests 11 and 12 are shown pivoted into the retracted position. The retractable armrest 11 is pivotable independent of the retractable armrest 12. The pivoting of either of the retractable armrests 11 and 12 into the retracted position facilitates the ingress and egress of the operator onto the foldable chair 20 of the personal mobility vehicle 10. The handlebar unit 62 of the tiller assembly 60 is shown pivoted on handlebar pivot 64 into a raised position for facilitating ingress and egress of the operator from the foldable personal mobility vehicle 30.

FIG. 6 is a side view similar to FIG. 5 illustrating the backrest 24 pivoted into the folded position. In the folded position, the backrest 24 is in a position generally parallel to the seat 22. Preferably, the backrest 24 is pivoted into the folded position for storage or transportation of the personal mobility vehicle 30.

Figure 7:
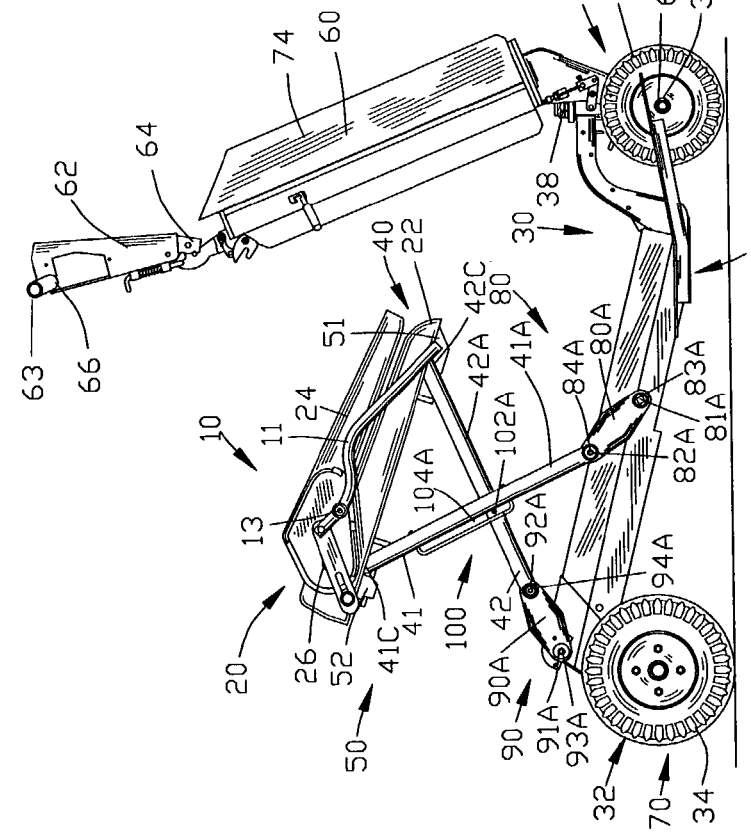
FIG. 7 is a side view similar to FIG. 6 illustrating the initial lowering of the foldable chair on the foldable personal mobility vehicle.
Figure 12:
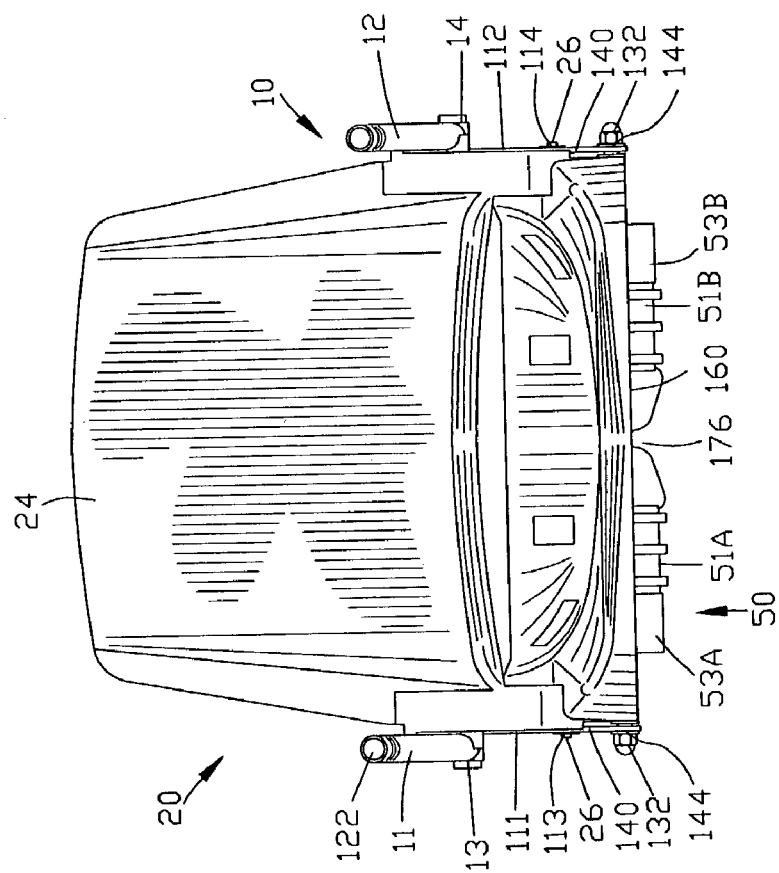
FIG. 12 is a front view of FIG. 11.

FIG. 7 is a side view similar to FIG. 6 illustrating the initial lowering of the foldable chair 20 on the foldable personal mobility vehicle 30. The second pivot arms 90A and 90B are shown partially pivoted counterclockwise about the pivots 93A and 93B. In this example, the pivoting of the second pivot arms 90A and 90B is effected by manually pivoting the second pivot arms 90A and 90B by an operator. The pivoting of the second pivot arms 90A and 90B moves the ends of the second U-shape support 42 outwardly from the ends of the first U-shape support 41.

Figure 8:
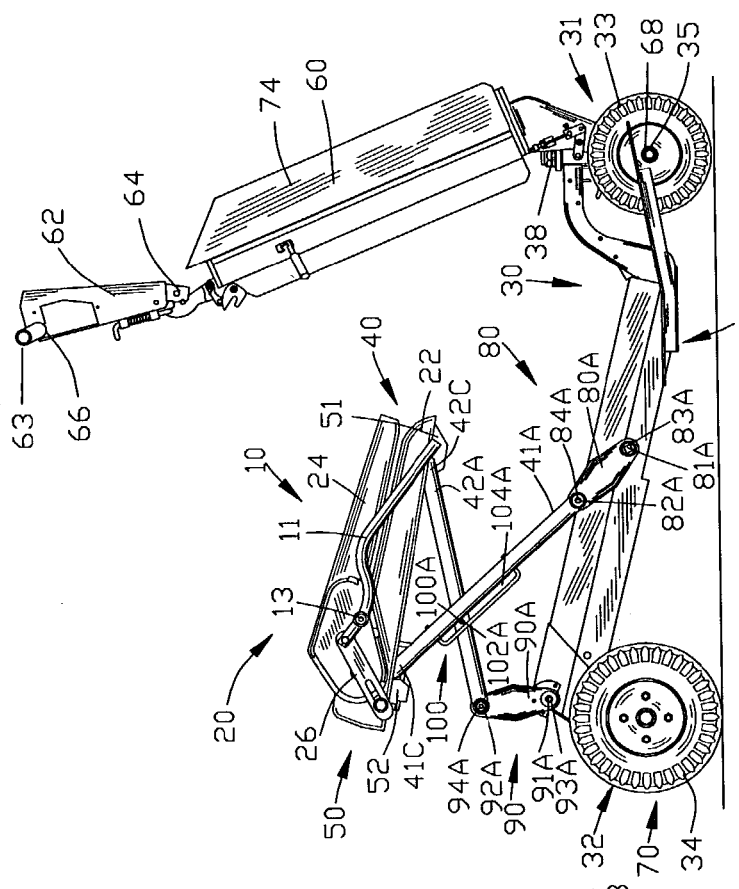
FIG. 8 is a side view similar to FIG. 7 illustrating the continued lowering of the foldable chair on the foldable personal mobility vehicle.

FIG. 8 is a side view similar to FIG. 7 illustrating the continued lowering of the foldable chair 20 on the foldable personal mobility vehicle 30. The second pivot arms 90A and 90B are shown further pivoted counterclockwise about the pivots 93A and 93B for further moving the ends of the second U-shape support 42 outwardly from the ends of the first U-shape support 41.

FIG. 9 is a side view similar to FIG. 8 illustrating the complete lowering of the foldable chair 20 on the foldable personal mobility vehicle 30. The second pivot arms 90A and 90B are shown fully pivoted counterclockwise about the pivots 93A and 93B for moving the location of the ends of the second U-shape support 42. When the foldable chair 20 is in the fully lowered position, the seat 22 of the foldable chair 20 engages with the personal mobility vehicle 10.

FIG. 10 is a side view similar to FIG. 9 illustrating the folding of the tiller unit 60 into the contracted condition. The handlebar unit 62 is pivoted on the handlebar pivot 64 to be substantially in alignment with the tiller unit 60. The tiller unit 60 is pivoted on pivot 68 to be substantially parallel with the foldable personal mobility vehicle 10. The pivoting of the tiller unit 60 on pivot 68 enables the tiller unit 60 to be folded into the contracted condition for the transportation and storage of the foldable personal mobility vehicle 30.

In should be appreciated by those skilled in the art that the foldable chair 20 may be lowered by rotating the first pivot arms 80A and 80B about the pivots 83A and 83B in clockwise direction. The rotating the first pivot arms 80A and 80B in clockwise direction about the pivots 83A and 83B may be effected by mechanical means. In the alternative, the rotating the first pivot arms 80A and 80B in clockwise direction about the pivots 83A and 83B may be effected by coupling the pivots 83A and 83B with a folding mechanism used to fold the folding personal mobility vehicle 30 about the frame pivot 37.

FIGS. 11–14 illustrate various enlarged views of the foldable chair 20 shown in FIGS. 1–10. The retractable armrest 10 for the foldable chair 20 includes plural seat rotation plates 111 and 112 located adjacent to the retractable armrest 11 and 12. The plural seat rotation plates 111 and 112 are secured to opposite sides of the backrest 24 of the foldable chair 20.

The rotation plates 111 and 112 include pivot apertures 113 and 114 for engaging with the chair pivot 26. The chair pivot 26 may be a single pivot or plural pivots for engaging with the pivot apertures 113 and 114. The pivot apertures 113 and 114 of the rotation plates 111 and 112 rotatably receive the chair pivot 26 to pivotably mount the backrest 24 to the seat 22.

The retractable armrest 11 extends between a first end 121 and 122 with an armrest pivot 13 located therebetween. The first end 121 of the retractable armrest 11 is located in close proximity to the armrest pivot 13. The second end 122 of the retractable armrest 11 is located remote from the armrest pivot 13 for providing a support for an arm of the occupant of the foldable chair 20.

A first pivot 131 is located on the first end 121 of the retractable armrest 11. Preferably, the first pivot 131 comprises a first pivot pin extending outwardly from the first end 121 of the retractable armrest 11. A second pivot 132 is located on the seat 22 of the foldable chair 20. Preferably, the second pivot 132 comprises a second pivot pin extending outwardly from the seat 22 of the foldable chair 20.

A link 140 extends between a first and a second end 141 and 142. In this embodiment of the invention, the link 140 is shown as a generally rigid plate such as a metallic plate, a polymeric plate or the like. The link 140 includes a link aperture 143 and a link slot 144. In this example, the link aperture 143 is located at the first end 141 of the link 140. However, it should be understood that the positions of the link aperture 143 and the link slot 144 may be reversed on the link 140. The link slot 144 is located at the second end 142 of the link 140. The link slot 144 extends between a first and a second slot end 151 and 152.

The first pivot 131 located on the first end 121 of the retractable armrest 11 is pivotably connected to the link aperture 143 located on the first end 141 of the link 140. The second pivot 132 located on the seat 22 of the foldable chair 20 is pivotably connected to the link slot 144 located on the second end 142 of the link 140.

Figure 15:
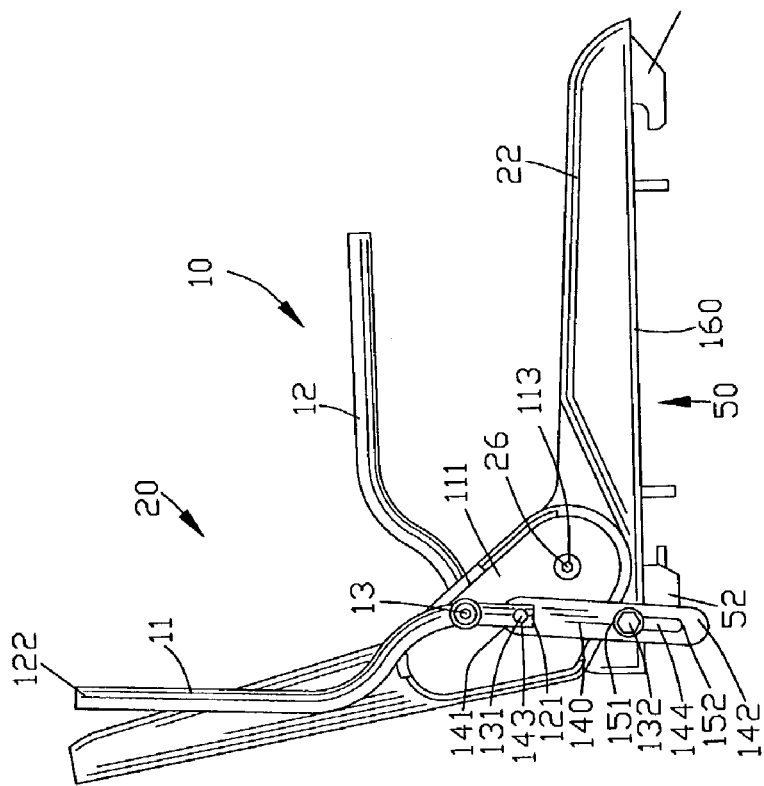
FIG. 15 is an enlarged view of the foldable chair of FIG. 1 with the backrest located in an operating position and with one of the retractable armrests being folded into the retracted position.

FIG. 15 is an enlarged view of the foldable chair 20 of FIG. 5 illustrating the backrest 24 located in an operating position. The retractable armrest 11 is located in the retracted position to be oriented generally parallel to the backrest 24. The retractable armrest 12 is located in the extended position to be oriented generally perpendicular to the backrest 24. When the backrest 24 is located in the operating position, either of the retractable armrest 11 and 12 may be moved independently between the retracted position and the extended position. The structure and operation of the retractable armrest 12 is identical to the structure and operation of the retractable armrest 11 and will not be described for the sake of brevity.

The second pivot 132 slides within the link slot 144 for enabling the retractable armrest 11 to rotate counterclockwise about the armrest pivot 13 to move from the extended position to the retracted position. When the retractable armrest 11 is moved into the retracted position, the second pivot 132 slides to the first end 151 of the link slot 144. The second pivot 132 engages with the first end 151 of the link slot 144 to limit the counterclockwise rotation of the retractable armrest 11.

Figure 16:
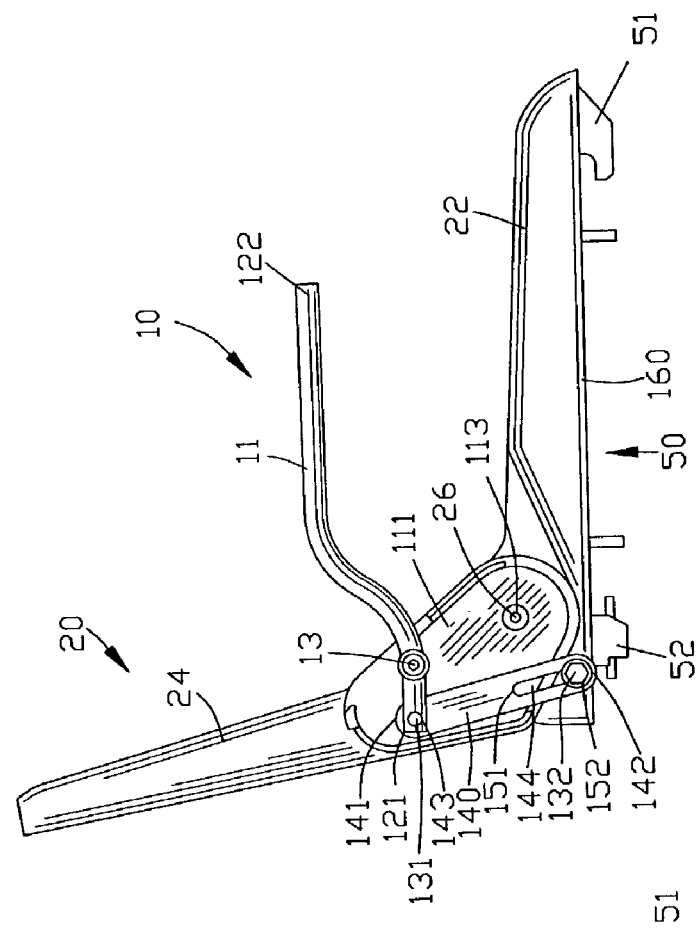
FIG. 16 is a view similar to FIG. 15 illustrating the backrest located in an operating position and with both of the retractable armrests located in the extended position.

FIG. 16 is a view similar to FIG. 15 illustrating the backrest 24 located in the operating position. Both of the retractable armrests 11 and 12 are located in the extended position. When the retractable armrest 11 is moved into the extended position, the second pivot 132 slides to the second end 152 of the link slot 144. The second pivot 132 engages with the second end 152 of the link slot 144 to limit the clockwise rotation of the retractable armrest 11.

FIG. 17 is a view similar to FIG. 16 illustrating the partial movement of the backrest 24 in a clockwise direction toward the folded position. The partial movement of the backrest 24 about pivot 26 toward the folded position pivots the retractable armrests 11 and 12 about pivots 13 and 14 toward the retracted position.

The second pivot 132 continuously engages the second end 152 of the link slot 144 of the link 140 to move the retractable armrest 11 upon the pivoting of the backrest 24 in a clockwise direction.

FIG. 18 is a view similar to FIG. 17 illustrating the complete clockwise movement of the backrest 24 into the folded position. The continued clockwise movement of the backrest 24 into the folded position results in the continued movement of the armrest 11 into the retracted position. The second pivot 132 continuously engages the second end 152 of the link slot 144 of the link 140 to rotate the retractable armrest 11 upon pivoting of the backrest 24 in a clockwise direction. The armrests 11 and 12 are automatically moved from the extended position into the retracted position upon movement of the backrest 24 from the operating position into the folded position.

The chair pivots 26 and the second pivot 132 are fixed relative to the seat 22 of the chair 20. The armrest pivot 13 and the first pivot 131 are moveable relative to the seat 22 of the chair 20. Since the chair pivot 26 is located vertically above the level of the second pivot 132, the armrest 11 undergoes a complex movement upon a clockwise rotation of the backrest 24 into the folded position. The armrest 11 undergoes a counterclockwise rotation about the armrest pivot 13 upon the initial clockwise rotation of the backrest 24. Subsequently, the armrest 11 undergoes a clockwise rotation about the armrest pivot 13 and/or the chair pivot 26 upon a continued clockwise rotation of the backrest 24.

Figure 11:
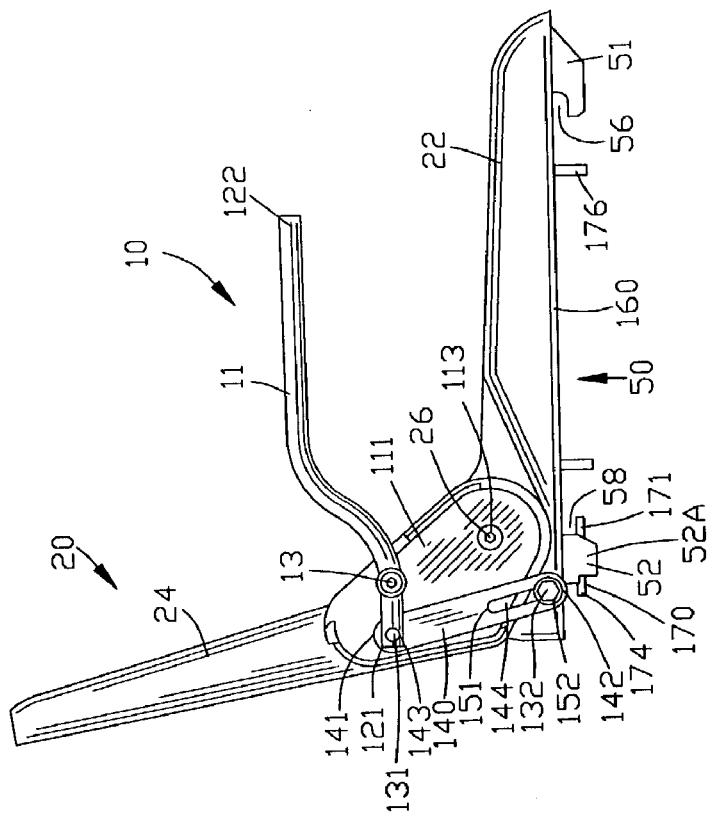
FIG. 11 is an enlarged view of the foldable chair of FIG. 1.

FIG. 19 is a bottom view of FIG. 11 with the chair 20 removed from the chair support 40 of the personal mobility vehicle 30. In this example, the chair 20 includes a seat frame 160 for supporting the seat 22. The seat frame 160 includes cross braces 161 and 162 surrounded by a peripheral frame 164. In this example of the invention, the cross braces 161 and 162 and the peripheral frame 164 are integrally formed from a polymeric material.

FIG. 20 is a view similar to FIG. 19 with the chair 20 being secured to the personal mobility vehicle 30. The chair coupling 50 comprises the front receiver 51 and the rear receiver 52 for receiving the first and second central legs 41C and 42C of the first and second U-shape supports 41 and 42. The front receiver 51 comprises plural front receivers 51A and 51B for pivotably receiving the central leg 42C of the U-shape support 42. Each of the plural front receivers 51A and 51B has a partially circular slot 56 for receiving the central leg 42C of the U-shape support 42. The front receiver 51 includes plural end receivers 53A and 53B for centering the central leg 42C of the U-shape support 42. Preferably, the plural front receivers 51A and 51B and the plural end receivers 53A and 53B are integrally formed with the cross braces 161 and 162 and the peripheral frame 164.

The rear receiver 52 comprises plural supports 52A and 52B for supporting a keeper 170. The rear receiver 52 includes plural end receivers 54A and 54B for centering the central leg 41C of the U-shape support 41.

The keeper 170 comprises a generally U-shaped keeper having a first and a second leg 171 and 172 and a handle 174. The first and second legs 171 and 172 extend through apertures defined in the plural supports 52A and 52B. A spring (not shown) biases the keeper 170 with the first and second legs 171 and 172 extending toward the plural front receivers 51A and 51B to form a slot 58 for retaining the central leg 41C of the U-shape support 41. Preferably, the plural rear supports 52A and 52B and the plural end receivers 54A and 54B are integrally formed with the cross braces 161 and 162 and the peripheral frame 164.

The chair coupling 50 includes a central receiver 176 for receiving a coupling leg 44 coupling the first U-shape support 41 to the second U-shape support 42. The central receiver 176 receives the coupling leg 44 interconnecting the first and second U-shape supports 41 and 42.

In this example, the chair 20 includes an alternate chair coupling 50. The alternate chair coupling 50 comprises the seat frame 160 includes a plurality of threaded apertures 166 for securing the seat frame 160 to a conventional pedestal mounting (not shown) of a personal mobility vehicle. A pedestal mounting (not shown) for a personal mobility vehicle is shown in U.S. Pat. No. 6,361,111 which is incorporated by reference into the present specification as if fully set forth herein.

FIG. 21 is a magnified side view of the chair 20 being secured to the chair support 40. The chair coupling 50 pivotably connects the first and second U-shape supports 41 and 42 to the foldable chair 20. The second U-shape support 42 of the foldable chair 20 is retained within the slot 56 formed by the front receiver 51. The first U-shape support 41 of the foldable chair 20 is retained within the slot 58 formed by the first and second legs 171 and 172 of the keeper 170.

FIG. 22 is a view similar to FIG. 21 with the chair 20 being removed from the chair support 40. The keeper 170 is shown moved toward the left in FIG. 22 by the handle 174 to move the first and second legs 171 and 172 in to the plural supports 52A and 52B. The movement of the keeper 170 toward the left in FIG. 22 eliminates the slot 58 for releasing the central leg 41C of the U-shape support 41. The release of the central leg 41C of the U-shape support 41 enables to the chair 20 to be rotated clockwise about the central leg 42C of the U-shape support 42 as shown in FIG. 22. After the rotation of the chair 20 about the central leg 42C of the U-shape support 42, the chair 20 may be removed from the chair support 40.

FIG. 23 is an enlarged view of the foldable chair of FIG. 1 with the backrest located in an operating position and illustrating an alternate embodiment of the foldable armrest 10A. A link 140A extends between a first and a second end 141A and 142A. In this embodiment of the invention, the link 140A is shown as a generally flexible wire such as a braided metallic, a polymeric cord or the like. The link 140A includes a first and a second aperture ring 143A and 144A secured to the first and second ends 141A and 142A of the link 140A.

The retractable armrest 11 is located in the retracted position to be oriented generally parallel to the backrest 24. The retractable armrest 12 is located in the extended position to be oriented generally perpendicular to the backrest 24. When the backrest 24 is located in the operating position, either of the retractable armrest 11 and 12 may be moved independently between the retracted position and the extended position.

The link 140A bends or flexes between the first and second ends 141A and 142A for enabling the retractable armrest 11 to rotate counterclockwise about the armrest pivot 13 to move from the extended position to the retracted position. A stop 148 may be provided for engaging with retractable armrest 11 to limit the counterclockwise rotation of the retractable armrest 11.

FIG. 24 is a view similar to FIG. 23 illustrating the backrest 24 located in the operating position. Both of the retractable armrests 11 and 12 are located in the extended position. When the retractable armrest 11 is moved into the extended position, the link 140A is taut between the first and second ends 141A and 142A to limit the clockwise rotation of the retractable armrest 11.

FIG. 25 is a view similar to FIG. 24 illustrating the partial movement of the backrest 24 in a clockwise direction toward the folded position. The partial movement of the backrest 24 about pivot 26 toward the folded position pivots the retractable armrests 11 and 12 about pivots 13 and 14 toward the retracted position. The link 140A remains taut between the first and second ends 141A and 142A to move the retractable armrest 11 upon the pivoting of the backrest 24 in a clockwise direction.

FIG. 26 is a view similar to FIG. 25 illustrating the complete clockwise movement of the backrest 24 into the folded position. The continued clockwise movement of the backrest 24 into the folded position results in the continued movement of the armrest 11 into the retracted position. The continuous tension on link 140A between the first and second ends 141A and 142A rotates the retractable armrest 11 upon pivoting of the backrest 24 in a clockwise direction. The armrests 11 and 12 are automatically moved from the extended position into the retracted position upon movement of the backrest 24 from the operating position into the folded position.

The present invention provides a retractable armrest for a foldable chair that enables the armrests to be rotated independently into the retracted position when the backrest is in the operating position. The present invention rotates the armrests from the extended position to the retracted position upon the backrest being moved from the operating position to the folded position. The retractable armrest for a foldable chair is suitable for use with a scooter, a power wheel chair, a foldable personal mobility vehicle or any other suitable chair. It should be appreciated by those skilled in the art that the retractable armrest for the foldable chair as set forth herein may be applied to any type of chair and should not be restricted for use only with a personal mobility vehicle.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A foldable chair comprising a seat and a backrest, the seat having a front end and a back end with the backrest having a lower end and an upper end and with a chair pivot pivotably mounting the lower end of the backrest to the back end of the seat for enabling the backrest to be pivoted between an operating position and a folded position, the improvement comprising:
    an armrest having a first and a second end;
    an armrest pivot for pivoting said armrest relative to the backrest;
    said armrest pivot located between said first and second ends of said armrest for pivotably mounting said armrest for rotational movement between an extended position and a retracted position;
    said armrest pivot positioned between the lower end and the upper end of the backrest;
    a first pivot located on said armrest and positioned closer to said first end of said armrest than said armrest pivot;
    said second end of said armrest providing an arm support for an occupant of the chair;
    a second pivot located on the seat and positioned closer to said back end of the seat than the chair pivot;
    a link operating between said first pivot and said second pivot for enabling said armrest to be rotated independently on said armrest pivot between said extended position and said retracted position when said backrest is in the operating position; and
    said link rotating said armrest on said armrest pivot from said extended position to said retracted position when the backrest is moved from the operating position to the folded position.

2. A foldable chair as set forth in claim 1, wherein the foldable chair is located on a personal mobility vehicle.

3. A foldable chair as set forth in claim 1, wherein the foldable chair is located on a scooter type personal mobility vehicle.

4. A foldable chair as set forth in claim 1, wherein the foldable chair is located on a power wheel chair type personal mobility vehicle.

5. A foldable chair as set forth in claim 1, wherein the foldable chair is located on a power wheel chair.

6. A foldable chair as set forth in claim 1, wherein said link extends between a first and a second end; and
    said first and second pivots pivotably connected to said first and second ends of said link.

7. A foldable chair comprising a seat and a backrest, the seat having a front end and a back end with the backrest having a lower end and an upper end and with a chair pivot pivotably mounting the lower end of the backrest to the back end of the seat for enabling the backrest to be pivoted between an operating position and a folded position, the improvement comprising:
    an armrest having a first and a second end;
    an armrest pivot for pivoting said armrest relative to the backrest;
    said armrest pivot located between said first and second ends of said armrest for pivotably mounting said armrest for rotational movement between an extended position and a retracted position;
    said armrest pivot positioned between the lower end and the upper end of the backrest;
    a first pivot located on said armrest and positioned closer to said first end of said armrest than said armrest pivot;
    said second end of said armrest providing an arm support for an occupant of the chair;
    a second pivot located on the seat and positioned closer to said back end of the seat than the chair pivot;
    a link operating between said first pivot and said second pivot for enabling said armrest to be rotated independently on said armrest pivot into said retracted position when said backrest is in the operating position;
    said link having a first and a second end;
    a link aperture located in one of said first and second ends of said link;
    a link slot located in the other of said first and second ends of said link;
    said first pivot pivotably connecting one of said link aperture and said link slot for pivotably connecting said link to said armrest;
    said second pivot pivotably connecting the other of said link aperture and said link slot for pivotably connecting said link to the seat; and
    said link rotating said armrest on said armrest pivot from said extended position to said retracted position when the backrest is moved from the operating position to the folded position.

8. A foldable chair as set forth in claim 1, wherein said link extends between a first and a second end;
    a link aperture located in said first end of said link;
    a link slot located in said second end of said link;
    said first pivot being pivotably connected to said link aperture; and
    said second pivot being pivotably connected to said link slot.

9. A foldable chair as set forth in claim 1, wherein said link is flexible.

10. A foldable chair as set forth in claim 1, wherein said chair pivot and said second pivot are fixed relative to said seat of the chair; and
    said first pivot being moveable relative to said seat of the chair.

11. A foldable chair of a personal mobility vehicle, the chair comprising a seat and a backrest, the seat having a front end and a back end with the backrest having a lower end and an upper end and with a chair pivot pivotably mounting the lower end of the backrest to the back end of the seat for enabling the backrest to be pivoted between an operating position whereat the backrest is in a position generally perpendicular to the seat and a folded position whereat the backrest is in a position generally parallel to the seat,
the improvement comprising:
    an armrest having a first and a second end;
    an armrest pivot for pivoting said armrest relative to the backrest;
    said armrest pivot located between said first and second ends of said armrest for mounting said armrest to the backrest for rotating said armrest between an extended position whereat said armrest is located generally perpendicular to the backrest and a retracted position whereat said armrest is located generally parallel to the backrest;

said armrest pivot positioned between the lower end and an upper end of the backrest;

said second end of said armrest providing an arm support for an occupant of the chair;

a first pivot located at said first end of said armrest and positioned closer to said first end of said armrest than said armrest pivot;

a second pivot located on the seat and positioned closer to said back end of the seat than the chair pivot;

a link operating between said first pivot and said second pivot for enabling said armrest to be rotated independently on said armrest pivot between said extended position and said retracted position when said backrest is in the operating position; and said link rotating said armrest on said armrest pivot from said extended position to said retracted position when the backrest being moved from the operating position to the folded position.

12. A foldable chair as set forth in claim 11, wherein the personal mobility vehicle is a scooter.

13. A foldable chair as set forth in claim 11, wherein the personal mobility vehicle is a power wheel chair.

14. A foldable chair as set forth in claim 11, wherein the personal mobility vehicle is a foldable personal mobility vehicle.

15. A foldable chair as set forth in claim 11, wherein said armrest pivot is located between said first and second end of said armrest.

16. A foldable chair as set forth in claim 11, wherein said armrest pivot is located in closer proximity to said first end than said second end of said armrest.

17. A foldable chair of a personal mobility vehicle, the chair comprising a seat and a backrest, the seat having a front end and a back end with the backrest having a lower end and an upper end and with a chair pivot pivotably mounting the lower end of the backrest to the back end of the seat for enabling the backrest to be pivoted between an operating position whereat the backrest is in a position generally perpendicular to the seat and a folded position whereat the backrest is in a position generally parallel to the seat, the improvement comprising:

an armrest having a first and a second end;

an armrest pivot for pivoting said armrest relative to the backrest;

said armrest pivot located between said first and second ends of said armrest for mounting said armrest to the backrest for rotating said armrest between an extended position whereat said armrest is located generally perpendicular to the backrest and a retracted position whereat said armrest is located generally parallel to the backrest;

said second end of said armrest providing an arm support for an occupant of the chair;

said armrest pivot positioned between the lower end and an upper end of the backrest;

a first pivot located at said first end of said armrest and positioned closer to said first end of said armrest than said armrest pivot;

a second pivot located on the seat and positioned closer to said back end of the seat than the chair pivot;

a link having a first and a second end;

a link aperture located in said first end of said link and a link slot located in said second end of said link;

said first and second pivots pivotably connected to said link aperture and said link slot of said link;

said link operating between said first pivot and said second pivot for enabling said armrest to be rotated independently on said armrest pivot into said retracted position when said backrest is in the operating position; and said link rotating said armrest on said armrest pivot from said extended position to said retracted position when the backrest being moved from the operating position to the folded position.

18. A foldable chair as set forth in claim 11, wherein said link extends between a first and a second end;

a link aperture located in one of said first and second ends of said link;

a link slot located in the other of said first and second ends of said link;

said first pivot being pivotably connected to said link aperture; and said second pivot being pivotably connected to said link slot.

19. A foldable chair as set forth in claim 11, wherein said link extends between a first and a second end;

a link aperture located in said first end of said link;

a link slot located in said second end of said link;

said first pivot being pivotably connected to said link aperture; and said second pivot being pivotably connected to said link slot.

20. A foldable chair as set forth in claim 11, wherein said first pivot extends outwardly from said first end of said armrest; and said second pivot extending outwardly from said the seat.

21. A foldable chair as set forth in claim 11, wherein said link is flexible.

* * * * *